United States Patent
Do

(10) Patent No.: US 7,667,902 B2
(45) Date of Patent: Feb. 23, 2010

(54) PICKUP LENS

(75) Inventor: Satoshi Do, 1-2-56 Miyado, Asaki-shi 351-0031, Saitama (JP)

(73) Assignees: Milestone Co., Ltd., Tokyo (JP); Satoshi Do, Saitama (JP)

( * ) Notice: Subject to any disclaimer, the term of this patent is extended or adjusted under 35 U.S.C. 154(b) by 52 days.

(21) Appl. No.: 11/597,644

(22) PCT Filed: Jul. 31, 2006

(86) PCT No.: PCT/JP2006/015119
§ 371 (c)(1),
(2), (4) Date: Nov. 27, 2006

(87) PCT Pub. No.: WO2007/069364
PCT Pub. Date: Jun. 21, 2007

(65) Prior Publication Data
US 2009/0185289 A1    Jul. 23, 2009

(30) Foreign Application Priority Data
Dec. 16, 2005    (JP) .............................. 2005-363087

(51) Int. Cl.
*G02B 9/14*    (2006.01)
(52) U.S. Cl. ....................... 359/789; 359/738; 359/739; 359/716
(58) Field of Classification Search ................. 359/716, 359/738, 739, 784
See application file for complete search history.

(56) References Cited

U.S. PATENT DOCUMENTS

| 6,028,713 | A  | 2/2000  | Ohno |
| 6,466,377 | B1 | 10/2002 | Saito et al. |
| 6,724,547 | B2 | 4/2004  | Sato |
| 6,795,253 | B2 | 9/2004  | Shinohara |

(Continued)

FOREIGN PATENT DOCUMENTS

JP    2002-221659    8/2002

(Continued)

OTHER PUBLICATIONS

European Search Report dated Feb. 13, 2009.

*Primary Examiner*—Evelyn A. Lester
(74) *Attorney, Agent, or Firm*—Venable LLP; James R. Burdett

(57) ABSTRACT

A pickup lens is provided with various aberrations corrected satisfactorily, with a short optical length, and with a sufficient back focus secured. The configuration comprises an aperture diaphragm S1, first lens L1, second lens L2, and third lens L3, and is configured by arranging, in order from the object side to the image side, the aperture diaphragm, first lens, second lens, and third lens. The first lens is a lens having positive refractive power, in a meniscus shape with the convex surface on the object side. The second lens is a lens having negative refractive power, in a meniscus shape with the convex surface on the image side. The third lens is a lens having negative refractive power, in a meniscus shape with the convex surface on the object side. Both of the surfaces of the first lens are aspherical, both of the surfaces of the second lens are aspherical, and both of the surfaces of the third lens are aspherical.

4 Claims, 11 Drawing Sheets

U.S. PATENT DOCUMENTS

| | | |
|---|---|---|
| 2003/0193605 A1 | 10/2003 | Yamaguchi |
| 2005/0002116 A1 | 1/2005 | Nakamura |
| 2005/0007481 A1 | 1/2005 | Yamaguchi et al. |
| 2005/0237632 A1 | 10/2005 | Nakamura |
| 2005/0253952 A1 | 11/2005 | Minefuji |
| 2006/0028740 A1 | 2/2006 | Murakami et al. |
| 2006/0092529 A1* | 5/2006 | Zeng et al. .................. 359/784 |
| 2009/0190236 A1* | 7/2009 | Do ............................ 359/716 |

FOREIGN PATENT DOCUMENTS

| | | |
|---|---|---|
| JP | 2002-244030 | 8/2002 |
| JP | 2003-149545 | 5/2003 |
| JP | 2004-4566 | 1/2004 |
| JP | 2004-219982 | 8/2004 |
| JP | 2004-302058 | 10/2004 |
| JP | 2004-302059 | 10/2004 |
| JP | 2004-302060 | 10/2004 |
| JP | 2005-173319 | 6/2005 |
| JP | 2005-227755 | 8/2005 |
| JP | 2005-292235 | 10/2005 |
| JP | 2005-338234 | 12/2005 |
| WO | WO-2005-119326 | 12/2005 |

* cited by examiner

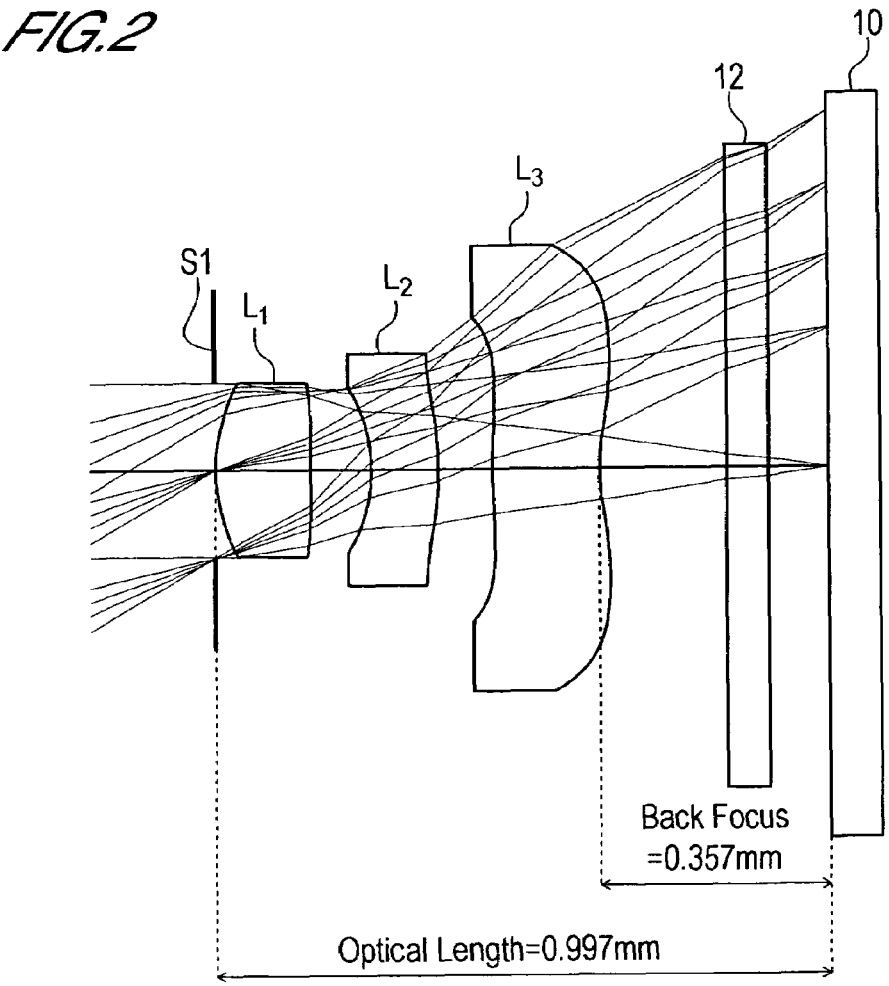
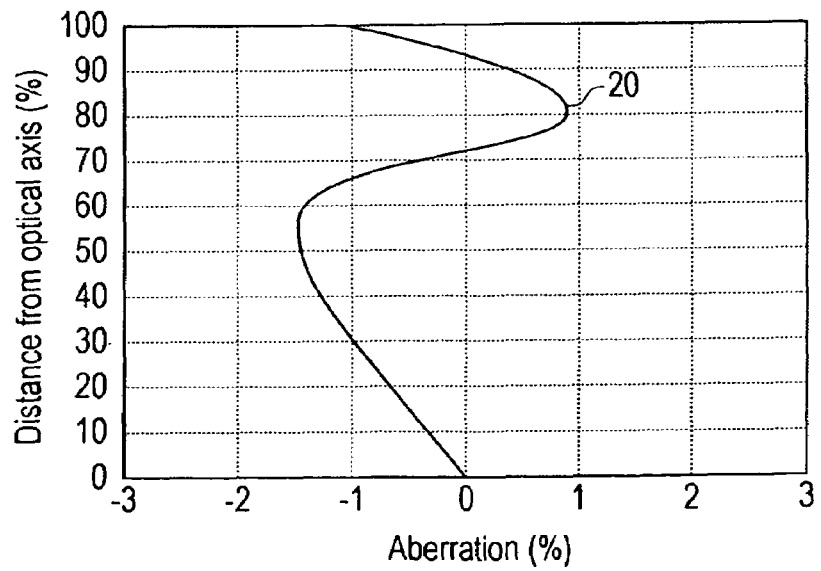

Back Focus =0.310mm

Optical Length=1.045mm

ID LENS

PICKUP LENS

TECHNICAL FIELD

The present invention relates to a pickup lens, and in particular relates to a pickup lens suitable for being mounted in the image input devices of portable telephone sets and personal computers, in digital cameras, CCD cameras for monitoring use, inspection devices, and similar, which use CCDs (Charge Coupled Devices) or CMOS (Complementary Metal Oxide Semiconductor) devices as image pickup elements.

BACKGROUND ART

It is necessary that the above described pickup lens have a short optical length, defined as the distance from the incidence plane on the object side of the pickup lens to the image formation plane (the pickup surface of the CCD or similar). That is, in lens design, measures are necessary to reduce the ratio of the optical length to the combined focal length of the pickup lens. Hereafter, a pickup lens with short optical length and small ratio of optical length to focal length may be called a compact lens.

Taking a portable telephone set as an example, at the least the optical length must be shorter than the thickness of the telephone set main unit. On the other hand, it is convenient that the back focus, defined as the distance from the exit plane on the image side of the pickup lens to the pickup surface, be as long as possible. That is, measures are necessary in the lens design to increase as much as possible the ratio of the back focus to the focal length. This is because of the need to insert a filter, cover glass, and other components between the pickup lens and the pickup surface.

In addition to the above, pickup lenses are of course required to have various aberrations corrected sufficiently that image distortion is not noticed visually, and moreover aberrations should be corrected so as to be sufficiently small as required by the integrated density of the image pickup element (also called "pixels"). That is, the various aberrations must be satisfactorily corrected; hereafter, an image in which aberrations have been satisfactorily corrected may be called a "satisfactory image".

As described below, pickup lenses with a three-element configuration, suitable for use in image capture equipment employing CCDs, CMOS devices and other solid-state image pickup elements, of which portable computers and videophones are representative, have been disclosed. Such lenses secure a broad angle of view, and can be made compact and lightweight.

Among these, a pickup lens has been disclosed, as a first lens with a three-element configuration, which provides satisfactory images while securing a broad angle of view (see for example Patent Document 1).

However, the shapes of the three lens elements, which are first, second, and third lenses are arranged in order from the object side, are those of a meniscus lens with convex surface on the image side and having positive refractive power as the first lens, a meniscus lens with convex surface facing the object side and having negative refractive power as the second lens, and a convex lens having positive refractive power as the third lens; and the construction has too long an optical length for the back focus length. As a result, the lens cannot be used as a compact lens.

As second through fourth three-element lenses, pickup lenses with a short focal length have been disclosed in which various aberrations have been satisfactorily corrected while securing a broad angle of view (see for example Patent Document 2, Patent Document 3, Patent Document 4).

Similarly to the above-described pickup lens, refractive powers of these three pickup lenses, with first, second, and third lenses being arranged from the object side, are the first lens having positive refractive power, the second lens having negative refractive power, and the third lens having positive refractive power. The combined focal length of the pickup lens is set to be short; but the back focus is long relative to the combined focal length, and the optical length is also too long. In addition, the lenses use a glass material, and so costs are high.

As a fifth three-element lens, a pickup lens has been disclosed which is made compact by employing an aspherical lens and by appropriately setting the power distribution and surface shape (see for example Patent Document 5).

However, in this pickup lens, comprising three lenses which are first, second, and third lenses arranged in order from the object side, the first lens has negative refractive power, the second lens has positive refractive power, and the third lens has negative refractive power; as a result, the pickup lens has a long optical length relative to the combined focal length. In addition, the lenses use a glass material, and so costs are high.

A sixth three-element lens has been disclosed which is a plastic lens with a set of meniscus-shape lenses having concave surfaces directed toward each other, and having at least one plastic lens with an aspherical surface, employing three lenses in the entire lens system to achieve compact size and low cost, and enabling easy suppression of focus movement accompanying temperature changes (see for example Patent Document 6).

However, in this pickup lens, with the refractive power of each of the three lenses of first, second, and third lenses being arranged in order from the object side, the first lens has weak refractive power, the second lens has weak refractive power, and the third lens has positive refractive power; consequently the third lens alone is not able to completely compensate for the refractive powers of the first and second lenses, and as a result the back focus is long relative to the combined focal length, and the optical length is also long. However, because the third lens is a glass lens, cost reduction is also inadequate.

A seventh three-element lens has been disclosed in which the lens system is divided into a front group and a rear group, in a telescopic-type lens configuration in which the front group has positive refractive power and the rear group has negative refractive power; the optical length is short, and the lens system is inexpensive (see for example Patent Document 7).

However, in this lens system, with the refractive power of each of the three lenses of first, second, and third lenses being arranged in order from the object side, the first lens has negative refractive power, the second lens has positive refractive power, and the third lens has negative refractive power, with a broad gap between the second lens and the third lens. For this reason the optical length is long relative to the combined focal length, and moreover there is the problem that the third lens has large diameter, making the pickup lens unsuitable for use in installation in devices for image input to portable telephone sets and personal computers or in digital cameras, CCD cameras for monitoring, inspection devices, or similar.

An eighth three-element pickup lens, having two positive lenses on the object side as well as a concave negative lens on the image side, both surfaces of which are aspherical, and the negative power of which gradually weakens in moving from the lens center toward the periphery until at the peripheral portion the power is positive, has been disclosed (see for example Patent Document 8).

However, a characteristic of this lens system is that the lens equivalent to the third lens L3 has negative power which gradually weakens in moving from the lens center toward the periphery, such that there exists a position at which the power changes to positive power, at a distance from the lens center in the range from 0.7 times to 1.0 times the effective aperture. In lenses disclosed as embodiments, the positions at which the power changes to positive are at distances from the lens center of 0.96 and 0.97 times the effective apertures, and so set nearly in the peripheral portion of the lens.

If the position at which the power changes to positive is set in the peripheral portion of the lens, then the angle of incidence on the image pickup element of light incident on the vicinity of intersection of the lens optical axis with the pickup surface and on the peripheral portion is nearly perpendicular, while at a position intermediate between the point of intersection of the lens optical axis and the pickup surface and the lens peripheral portion, the angle of incidence on the image pickup element deviates greatly from perpendicular. Hence the angle of incidence of light at positions intermediate from the lens peripheral portion, which are of importance to the image, deviates greatly from the perpendicular, so that light is incident on the image pickup element from an angle oblique to the image pickup element and the amount of reflection at the pickup surface increases, the amount of optical energy reaching the photoelectric conversion face of the image pickup element is reduced, and consequently there is the problem that the image in this portion becomes dark.

Further, because the first lens has positive refractive power, the second lens also has positive refractive power, and the third lens has negative refractive power, the optical length becomes long, and the lens cannot easily be made compact. In addition, the aperture diaphragm is positioned between the first lens and the second lens, so that the effective aperture of the first lens must be made large, and as a result it is difficult to position a mechanical shutter on the object side of the first lens.

As a ninth three-element configuration, a pickup lens has been disclosed in which are arranged, in order from the object side, an aperture diaphragm, a first lens with a biconvex shape having positive refractive power, a second lens with a concave surface directed toward the object side and having negative refractive power, and a third lens with a meniscus shape, with the convex surface directed toward the object side (see for example Patent Document 9).

This lens system is designed such that a satisfactory image can be obtained when the aperture diaphragm is positioned on the object side of the first lens. By positioning the aperture diaphragm on the object side of the first lens, the position of the entrance pupil can be brought close to the object. By this means, there is the characteristic that the principal ray can be made incident on the pickup surface at a nearly perpendicular angle. If the principal ray is made incident on the pickup surface at an oblique angle, shading occurs, in which the amount of light incident on pixels (the image pickup element) positioned in the pickup surface is reduced, and so a problem arises in which the image is darker in the peripheral portions of the picture area.

This problem arises from the fact that when a ray is incident on the image pickup element at an oblique angle to the image pickup element, the amount of light reflected at the surface of the image pickup element increases, and the amount of optical energy reaching the photoelectric conversion face of the image pickup element is reduced. That is, by positioning the aperture diaphragm on the object side of the first lens, a pickup lens design is possible in which shading does not readily occur.

When, in a lens system designed based on such design principles, a diaphragm is further placed between the first lens and the second lens for the purpose of preventing flare, which is a phenomenon in which contrast in the image is decreased, or smear, which is a phenomenon of blurring of the image, the following may occur. Among the principal ray passing through the aperture diaphragm, the principal ray incident at a large angle of incidence to the optical axis of the pickup lens is blocked by this diaphragm. As a result, although stray light which may cause flare or smear and detract from image quality may be blocked, a portion of the principal ray is blocked, as described above, and in some cases the amount of light at the periphery of the image may be decreased, giving rise to the problem of darkness at the peripheral portions of the image.

This lens system has, as the lens equivalent to the third lens, a meniscus lens having positive refractive power; as a characteristic resulting from this, the back focus is relatively short compared with the optical length. Hence, if the back focus is made long in order to insert a filter, cover glass and other components between the pickup lens and the pickup surface, the optical length also becomes long, and there is the problem that the lens system itself becomes too large.

As a tenth three-element lens, a pickup lens has been disclosed in which are arranged, in order from the object side, a first lens with convex shape on the object side and having positive refractive power; a diaphragm; a second lens of a plastic material, at least one surface of which has an aspherical shape, with concave surface on the object side and having positive or negative refractive power; and, a third lens with a meniscus shape, both surfaces of which have an aspherical shape, with a convex surface on the object side and having positive refractive power (see for example Patent Document 10).

This tenth three-element lens is designed so as to obtain satisfactory images on the assumption that a diaphragm is set between the first and second lenses, and that this diaphragm functions as an aperture diaphragm. Hence when a shutter or similar is placed on the object side of the first lens, the incidence aperture to this lens is narrowed by the shutter or similar. That is, the shutter or similar effectively functions as a diaphragm, so that a portion of the principal ray incident on the diaphragm is blocked. The principal ray incident on the lens at a large angle with the optical axis is a ray which forms the image in the peripheral portion; this ray is blocked by the shutter or similar placed on the object side of the first lens, and so there is the possibility of a problem in which the peripheral portion of the image becomes dark.

In addition, in this lens system also, similarly to the above-described ninth three-element lens, the lens equivalent to the third lens is a meniscus lens having positive refractive power. Hence in this lens system also, similarly to the ninth three-element lens, if the back focus is made long then the optical length becomes long, and there is the problem that the lens system itself becomes too large.

As an eleventh three-element lens, a pickup lens has been disclosed in which are arranged, in order from the object side, a first lens of a glass material, with a convex surface shape on the object side and having positive refractive power; a second lens with a meniscus shape, formed of a plastic material, at least one surface of which is an aspherical shape, with concave surface on the object side and having positive refractive power; and a third lens, formed from a plastic material, both surfaces of which have an aspherical shape, with convex surface on the object side, and having positive or negative refractive power (see for example Patent Document 11).

The basic configuration of the eleventh three-element lens is the same as that of the tenth three-element lens, and so there are problems similar to those described above for the tenth three-element lens.

As a twelfth three-element lens, a pickup lens has been disclosed in which are placed, in order from the object side, a first lens having at least one surface of which is aspherical in shape, with both surfaces having convex shapes, and having positive refractive power; a diaphragm; a second lens with a meniscus shape, at least one surface of which is aspherical in shape, which has a convex surface on the object side and positive refractive power; and a third lens, both surfaces of which are aspherical in shape, having positive or negative refractive power, formed of a plastic material, and with a convex surface shape on the object side (see for example Patent Document 12).

The basic configuration of the twelfth three-element lens is similar to that of the above-described tenth and eleventh three-lens configuration lenses. Hence there are problems similar to the above-described problems of the tenth and eleventh three-element lenses.

As a thirteenth three-element lens, a pickup lens has been disclosed in which there are, placed in order from the object side, a first lens with a convex surface on the object side and with positive refractive power; a second lens, in a meniscus shape, with convex surface on the image side and having negative refractive power; and a third lens, with a convex surface on the object side, and having positive refractive power. Pickup lenses have been disclosed which have a diaphragm placed on the object side of the first lens, and which have a diaphragm placed between the first lens and the second lens (see for example Patent Document 13).

That is, a pickup lens designed on the assumption that satisfactory images are obtained by causing a diaphragm placed on the object side of the first lens to function as an aperture diaphragm, and a pickup lens designed on the assumption that satisfactory images are obtained by causing a diaphragm placed between the first and second lenses to function as an aperture diaphragm, have been disclosed.

As explained above, when a diaphragm is further placed between the first lens and the second lens in a pickup lens designed so as to obtain satisfactory images on the assumption that a diaphragm placed on the object side of the first lens is made to function as an aperture diaphragm, the principal ray incident at a large incidence angle with the optical axis of the pickup lens among the principal ray passing through the aperture diaphragm is blocked by the additionally placed diaphragm. Similarly, when a diaphragm is placed on the object side of the first lens of a pickup lens designed so as to obtain satisfactory images on the assumption than a diaphragm placed between the first lens and the second lens is made to function as an aperture diaphragm, the principal ray incident at a large incidence angle with the optical axis of the pickup lens among the principal ray passing through the aperture diaphragm is blocked by the additionally placed diaphragm.

As a result, as described above, while stray light which may cause flare, smear or similar, detracting from image quality, can be eliminated, a portion of the principal ray is blocked as described above, and in some cases the amount of light at the periphery of the image may be decreased, giving rise to the problem of darkness at the peripheral portions of the image.

In the thirteenth three-element lens, similarly to the above-described ninth three-element lens, the lens equivalent to the third lens is a meniscus lens having positive refractive power. Hence in this lens system also, similarly to the ninth three-element lens, if the back focus is made long the optical-length will also be long, and so there is the problem that the lens system itself will be too large.

As a fourteenth three-element lens, a pickup lens has been disclosed in which are placed, in order from the object side, a first lens with a convex surface on the object side, having positive refractive power; an aperture diaphragm; a second lens with a meniscus shape, with the convex surface on the image side, having positive refractive index; and a third lens with a concave surface on the image side, having negative refractive power (see for example Patent Document 14).

In this pickup lens, the value of the ratio $f_1/f$ of the focal length $f_1$ of the first lens to the focal length of the entire pickup lens system is set so as to satisfy $0.8<f_1/f<2.0$. Hence the refractive power of the first lens is weak, and the optical length must be made long. Consequently the lens cannot be made compact. Further, a lens having positive refractive power is adopted as the second lens, and the radius of curvature of the surface of this second lens on the image side (the convex surface directed toward the image) must be made small. As a result the lens surface curvature is large, and so mold machining becomes difficult.

As a fifteenth three-element lens, a small image formation lens has been disclosed which comprises, in order from the object side, an aperture diaphragm; a first lens having positive refracting power; a second lens having negative refracting power; and a third lens having positive or negative refracting power; and which satisfies, as one condition, $0.9<f/f_1<1.3$ (see for example Patent Document 15). The condition equation $0.9<f/f_1<1.3$ can be rewritten as $0.769<f_1/f<1.111$.

When in this small image formation lens the refractive power of the first lens falls below that of the condition equation $0.769<f_1/f<1.111$ (when $f_1/f$ is equal to or less than 0.769), various aberrations increase, and a satisfactory image can no longer be obtained. As a result, the optical length becomes long, and there is the problem that the lens cannot be made compact.

As a sixteenth three-element lens, a pickup lens has been disclosed which comprises, in order from the object side, a first lens having mainly positive refractive power, with a convex surface facing the object side; a second lens in a meniscus shape, with the concave surface on the object side; and a third lens, which functions as a correction lens (see for example Patent Document 16). This pickup lens is configured to obtain satisfactory images by positioning an aperture diaphragm between the first lens and the second lens.

Recent CCDs, CMOS devices and other electronic image pickup elements have moved into the megapixel range, incorporating from one million to 3.2 million pixels. In an image pickup device which utilizes a pickup surface comprising such a large number of pixels, image distortion problems tend to occur when capturing video. In order to avoid such problems, a shutter must be installed at the incidence surface of the pickup lens, and the shutter diameter must be made small. That is, the shutter is also made to function as a diaphragm, and so in general the design must assume that the diaphragm will be installed at the incidence surface of the pickup lens. And, by installing a shutter at the incidence surface of the pickup lens, there is the further advantageous result that smear is prevented.

The pickup lens disclosed in Patent Document 16 has not been designed to accommodate megapixel pickup surfaces. As a result, the shutter positioned at the incidence surface of this pickup lens blocks a portion of the incident rays, and so there is the problem that the peripheral light quantity is reduced.

When a shutter is installed on the object side of the first lens, corresponding to the incidence surface of the pickup lens, the incidence aperture is narrowed. That is, when a pickup lens configured with an aperture diaphragm positioned between the first lens and the second lens is mounted in a CCD camera or similar and used, a shutter is provided on the object side of the first lens. This shutter effectively functions as a second diaphragm, with the result that a portion of the incident rays is blocked. In other words, the principal ray incident on the lens at a large angle to the optical axis contributes to formation of the image in the peripheral portions, but because this principal ray is blocked by the shutter, the peripheral portions of the image become dark.

Further, the value of $f_1/f$ for the pickup lens disclosed in Patent Document 16 is within the range from 0.65 to 0.736. That is, in this pickup lens the refractive power of the first lens is set to be weak, and as a result the optical length is long, and so the lens cannot be made compact.

As a seventeenth three-element lens, a pickup lens has been disclosed in which are positioned, in order from the object side, a first lens with a meniscus shape, having the convex surface on the object side and with positive refractive power; an aperture diaphragm; a second lens with a meniscus shape, having the convex surface on the image side and with negative refractive power; and a third lens, having positive refractive power (see for example Patent Document 17). As characteristics of this pickup lens, the first lens has a strong positive refractive power, while the second and third lenses function as supplementary lenses.

This lens, by capturing rays including the principal rays with large incidence angles with the optical axis, ensures that brightness is uniform into the peripheral portions of the image. Hence if a mechanical shutter is installed at the object-side surface of the first lens, there is the problem that a portion of the incident rays is blocked by this mechanical shutter, so that the peripheral liquid quantity in the image is reduced and these areas become dark. That is, this pickup lens captures only principal rays with small incidence angles with the optical axis, and so is not designed to ensure uniform brightness extending to the peripheral portions of the image.

Further, because the value of the ratio $R_1/R_2$ of the radius of curvature $R_1$ of the object-side surface to the radius of curvature $R_2$ of the image-side surface of the first lens is set to be large, it is difficult to sufficiently reduce distortion aberration and other aberrations so as to obtain a satisfactory image.

As an eighteenth three-element lens, a pickup lens has been disclosed in which are positioned, in order from the object side, a first lens both surfaces of which are convex; a second lens with a meniscus shape, the concave surface of which is on the object side; and a third lens with a meniscus shape, the convex surface of which is on the object side (see for example Patent Document 18). However, because in this pickup lens the third lens is a meniscus lens with positive refractive power, the ratio L/2Y of the optical length L to the image height 2Y, defined as the length of the diagonal line in the rectangular light-receiving area of the solid-state image pickup element installed at the image plane of the pickup lens, takes on values of 1.0 or higher, and the pickup lens cannot be made compact.

Patent Document 1: Japanese Unexamined Patent Application Publication No. 2001-075006
Patent Document 2: Japanese Unexamined Patent Application Publication No. 2003-149548
Patent Document 3: Japanese Unexamined Patent Application Publication No. 2002-221659
Patent Document 4: Japanese Unexamined Patent Application Publication No. 2002-244030
Patent Document 5: Japanese Unexamined Patent Application Publication No. 2003-149545
Patent Document 6: Japanese Unexamined Patent Application Publication No. 10-301022
Patent Document 7: Japanese Unexamined Patent Application Publication No. 10-301021
Patent Document 8: Japanese Unexamined Patent Application Publication No. 2003-322792
Patent Document 9: Japanese Unexamined Patent Application Publication No. 2004-004566
Patent Document 10: Japanese Unexamined Patent Application Publication No. 2004-302058
Patent Document 11: Japanese Unexamined Patent Application Publication No. 2004-302059
Patent Document 12: Japanese Unexamined Patent Application Publication No. 2004-302060
Patent Document 13: Japanese Unexamined Patent Application Publication No. 2005-004045
Patent Document 14: Japanese Unexamined Patent Application Publication No. 2005-242286
Patent Document 15: Japanese Unexamined Patent Application Publication No. 2005-227755
Patent Document 16: Japanese Unexamined Patent Application Publication No. 2005-309210
Patent Document 17: Japanese Unexamined Patent Application Publication No. 2004-219982
Patent Document 18: Japanese Unexamined Patent Application Publication No. 2005-173319

DISCLOSURE OF THE INVENTION

Problems to be Solved by the Invention

Hence one object of the invention is to provide a pickup lens, suitable for mounting in a camera using a CCD or CMOS device as the image capture element, with a short optical length, and back focus as long as possible, and from which satisfactory images can be obtained. A short optical length means, specifically, that the ratio of the optical length to the focal length is small. A long back focus means, specifically, that the ratio of the back focus to the focal length is large.

Further, by realizing all three lenses of a pickup lens of this invention using a plastic material, a pickup lens can be provided at low cost and with light weight. Here, a plastic material is a polymer material which can be formed into a lens through molding by plastic deformation, using heat or pressure or both, and which is transparent to visible light.

Means for Solving the Problems

In order to attain the above-described objects, the pickup lens of this invention, mounted in an image pickup device comprising a solid-state image pickup element, the length of the diagonal line in the rectangular light-receiving area of which is 2Y, comprises an aperture diaphragm S1, a first lens L1, a second lens L2, and a third lens L3, and is configured by arranging in order, from the object side to the image side, the aperture diaphragm S1, the first lens L1, the second lens L2, and the third lens L3. The first lens L1 is a lens with a meniscus shape having positive refractive power, with the convex surface directed toward the object side. The second lens L2 is a lens having negative refractive power, in a meniscus shape with the convex surface directed toward the image side. The third lens L3 is a lens having negative refractive power, in a meniscus shape with the convex surface directed toward the object side.

Both surfaces of the first lens L1 are aspherical, both surfaces of the second lens L2 are aspherical, and both surfaces of the third lens L3 are aspherical.

Further, this pickup lens satisfies the following conditions (1) through (4).

$$0.57 < f_1/f < 0.65 \tag{1}$$

$$0.01 \leq r_2/r_3 \leq 0.05 \tag{2}$$

$$0.1 \leq d_3/f < 0.15 \tag{3}$$

$$0.6 < L/2Y < 0.9 \tag{4}$$

Where f: combined focal length of the pickup lens $f_1$: focal length of the first lens L1

$r_2$: radius of curvature of the object-side surface of the first lens L1 in the vicinity of the optical axis (radius of curvature at the optical axis)

$r_3$: radius of curvature of the image-side surface of the first lens L1 in the vicinity of the optical axis (radius of curvature at the optical axis)

$d_3$: interval between the first lens L1 and second lens L2 along the optical axis L: distance in air along the optical axis from the object-side surface of the first lens L1 to the image plane (optical length)

2Y: length of a diagonal line of the rectangular light-receiving area of the solid-state image pickup element installed in the image plane of the pickup lens Here, when a filter, cover glass, or other component or other planar sheet is inserted between the third lens L3 and the image plane, the distance in air is calculated to obtain the above-described L taking the portion of this planar sheet as the equivalent distance in air. Similarly in the following explanations, the distance in air refers to the distance calculated taking the equivalent distance in air of the planar sheet portion. That is, if the geometric distance through the planar sheet portion is a, and the refractive index is n, then the distance a is taken to be equivalent to a/n.

The back focus bf, defined as the distance from the exit plane on the image side of the pickup lens to the pickup surface, is here the distance along the optical axis from the image-side surface of the third lens L3 to the image plane. The image height 2Y is the length of the diagonal line of the effective picture area, that is, the length of the diagonal line in the rectangular light-receiving area of the solid-state image pickup element installed at the image plane of the pickup lens.

In the pickup lens of this invention, it is preferable that the refractive index of the material of the second lens L2 be higher than the refractive indices of the materials of the first lens L1 and third lens L3, and that the Abbe number of the material of the second lens L2 be smaller than the Abbe numbers of the materials of the first lens L1 and third lens L3.

Further, in the pickup lens of this invention, it is suitable that the first lens L1, second lens L2, and third lens L3 be formed using materials with Abbe numbers in the range from 30 to 60. Further, the first lens L1 and third lens L3 may be lenses formed using a cycloolefin plastic material, while the second lens L2 may be formed using a polycarbonate material.

EFFECTS OF THE INVENTION

By using as the first lens L1 a lens having positive refractive power, in a meniscus shape with convex surface on the object side, using as the second lens L2 a lens having negative refractive power, in a meniscus shape with convex surface on the image side, and using as the third lens L3 a lens having negative refractive power, in a meniscus shape with convex surface on the object side, the optical length L can be made short, as explained below.

The advantageous results of pickup lenses of this invention, obtained by satisfying the conditions of equations (1) to (4), are as follows.

The above condition equation (1) is a condition equation which stipulates the refractive power of the first lens; if the ratio $f_1/f$ is smaller than the upper limit, then the refractive power of the first lens L1, which alone among the first lens L1, second lens L2, and third lens L3 has positive refractive power, can be set to an appropriate magnitude. That is, the refractive power of the first lens L1 can be set to a magnitude within the range in which aberrations are so large that satisfactory images are not obtained, and the total length of the pickup lens can be made short.

If the value of $f_1/f$ is larger than the lower limit, then the positive refractive power of the first lens L1 is not larger than is necessary, and higher-order spherical aberration and coma aberration-occurring for the first lens L1 can be made small.

The above condition equation (2) is a condition equation which stipulates the ratio of the radius of curvature at the optical axis of the first surface (object-side surface) to the radius of curvature at the optical axis of the second surface (image-side surface) of the first lens L1. If this ratio is larger than the lower limit provided by the condition equation (2), then the back focus bf of the pickup lens is sufficient to enable insertion of cover glass, a filter, or other component between the pickup lens and the pickup surface, and moreover the length can be set within a range which does not detract from the compactness of the equipment in which the pickup lens is mounted. In addition, spherical aberration is not too great, and the first surface of the first lens L1 can easily be machined.

If the ratio of the radius of curvature at the optical axis of the first surface (object-side surface) to the radius of curvature at the optical axis of the second surface (image-side surface) of the first lens L1 is smaller than the upper limit provided by the condition equation (2), then the back focus bf can be made short, and so the pickup lens can be made compact. Further, spherical aberration and astigmatic aberration do not take on positive values that are too large. In addition, distortion aberration, although assuming a negative value, does not have too large an absolute value. Consequently these aberrations can be corrected so as to remain within the required ranges by the second lens L2 and third lens L3. Further, the principal point of the first lens L1 can easily be positioned in front, so that the angle of incidence of rays incident on the image plane can be made small. As a result, there is the advantageous result that shading does not readily occur.

The above condition equation (3) is a condition equation which stipulates the range of values to be taken by the interval $d_3$ along the optical axis between the first lens L1 and the second lens L2, normalized by the combined focal length f of the pickup lens.

If the value of $d_3/f$ is greater than the lower limit provided by condition equation (3), then the incidence angles of rays on the outer periphery which are incident on the image plane are not too large, and so-called "vignetting" in the image plane due to a micro-lens does not occur. Hence the peripheral portions of the image do not become too dark, and a good-quality image is obtained. Also, the back focus bf is not too long. Further, if the value of $d_3/f$ is smaller than the upper limit stipulated by the condition equation (3), there is no need for a large aperture for the third lens L3, and the overall size of the pickup lens can be kept compact. If the value of $d_3/f$ is within the range stipulated by the condition equation (3), distortion aberration, spherical aberration, and curvature of field can be made sufficiently small.

The above condition equation (4) is a condition equation which stipulates the range of values to be taken by the ratio of the optical length L to the image height 2Y, that is, the length of the diagonal line in the rectangular light-receiving area of the solid-state image pickup element installed at the image plane of the pickup lens.

If the value of L/2Y is greater than the lower limit stipulated by the condition equation (4), then the thicknesses of the first lens L1, second lens L2, and third lens L3 can be equal to or greater than the thicknesses necessary at the time of lens formation. That is, when the first lens L1, second lens L2 and third lens L3 are formed using a resin material, if the thickness of the lens at the time of injection molding is too thin, then it becomes difficult to inject the resin material so as to flow uniformly into the mold. Hence when forming lenses using a resin material, the lens thickness needs to be at least a certain value. If the ratio L/2Y is larger than the lower limit stipulated by the condition equation (4), an adequate lens thickness can be secured.

Further, if the value of L/2Y is smaller than the upper limit stipulated by the condition equation (4), then even if the outer diameters of the first lens L1, second lens L2 and third lens L3 are not made so large as to detract from compactness, it is possible to keep the peripheral light quantity ratio of the pickup lens from becoming too small. If the outer diameter can be made small, then the distance in air along the optical axis from the object-side surface of the first lens L1 to the image plane, that is, the total lens length, can also be made short, through a multiplication effect.

Hence by means of the lens configuration for the pickup lens of the above-described invention which satisfies the four conditions of the condition equations (1) to (4), small-size and compact pickup lenses which eliminate the above-described problems, and using which good-quality images are obtained, can be provided. Also, a pickup lens can be provided in which, by capturing only principal rays at a small angle of incidence to the optical axis, brightness can be made uniform up to the peripheral portions of the image.

The pickup lens of this invention has as a characteristic the positioning of the aperture diaphragm S1, which determines the entrance pupil, in front of the first lens L1, that is, on the object side of the first lens L1. By this means, the entrance pupil can be brought closer to the object side, principal rays can be made incident on the picture area at an angle close to perpendicular, and the occurrence of shading can be prevented.

Further, if the refractive index of the material of the second lens L2 is higher than the refractive indices of the materials of the first lens L1 and third lens L3, and if the Abbe number of the material of the second lens L2 is lower than the Abbe numbers of the materials of the first lens L1 and third lens L3, then chromatic/spherical aberration can be effectively reduced.

If the second lens L2 is formed from polycarbonate, and the first lens L1 and third lens L3 are formed from a cycloolefin plastic, then the refractive index of the material of the second lens L2 is higher than the refractive index of the material of the first lens L1 and third lens L3, and the Abbe number of the material of the second lens L2 can be made lower than the Abbe number of the material of the first lens L1 and third lens L3.

The refractive index of cycloolefin plastic is 1.5300, and the refractive index of polycarbonate is 1.5830, while the Abbe number of cycloolefin plastic is 56.0, and the Abbe number of polycarbonate is 30.0, and so these materials can be used in a pickup lens of this invention.

Cycloolefin plastic and polycarbonate are known as materials which are suited to formation of lenses using the injection molding method, which is a well-established manufacturing technology. Of course, the materials are not limited to particular plastic materials, and plastic materials and molded glass materials having Abbe numbers in the range from 30 to 60 can be used.

In the first through fifth Embodiments described below, the first lens L1 and third lens L3 are formed from cycloolefin plastic, and the second lens L2 is formed from polycarbonate.

BRIEF DESCRIPTION OF THE DRAWINGS

FIG. 2 is a cross-sectional view of the pickup lens of a first Embodiment;

FIG. 3 is a diagram of distortion aberration of the pickup lens of the first Embodiment;

Figure 1:
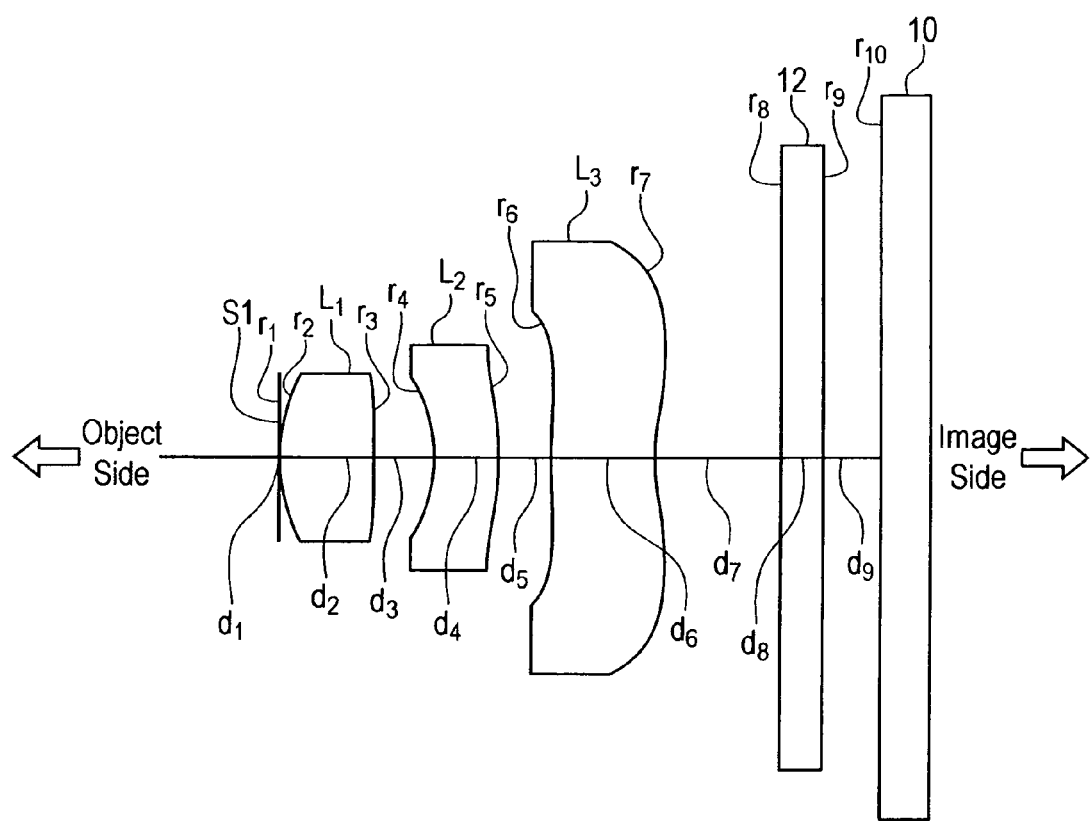
FIG. 1 is a cross-sectional view of the pickup lens of this invention.

EXPLANATIONS OF LETTERS OR NUMERALS 10 imaging element
12 cover glass
S1 diaphragm
L1 first lens L2 second lens
L3 third lens

BEST MODE FOR CARRYING OUT THE INVENTION

Below, aspects of the invention are explained, referring to the drawings. These drawings merely show in summary manner the shapes, sizes and positional relations of constituent components to an extent enabling understanding of the invention; moreover, the numerical conditions and other conditions explained below are merely suitable examples, and this invention is in no way limited to these aspects.

FIG. 1 shows the configurations of the pickup lens of the invention. The surface numbers, intervals between surfaces, and other symbols defined in FIG. 1 are used in common in FIG. 2, FIG. 6, FIG. 10, FIG. 14, and FIG. 18.

Counting from the object side, the first, second, and third lenses are represented by L1, L2, and L3, respectively, and the aperture diaphragm positioned in front of the first lens L1 is represented by S1. In addition to using variables $r_i$ (i=1, 2, 3, ..., 10) as indicating the radius of curvature at the optical axis, so long as there is no chance for misunderstanding, similar symbols are also used to distinguish lenses, cover glass, and the pickup surface (for example, with $r_2$ used to represent the object-side surface of the first lens).

The $r_i$ (i=1, 2, 3, ..., 10) and $d_i$ (i=1, 2, 3, ..., 9) and other parameters used in the figures are provided with specific numerical values in Table 1 through Table 5 below. Values of the subscript i are assigned in order moving from the object side to the image side, corresponding to the lens surface number, or to the lens thickness or interval between lenses, and similar.

That is, $r_i$ is the radius of curvature at the optical axis of the ith surface; $d_i$ is the distance from the ith surface to the i+1th surface; $N_i$ is the refractive index of the material of the lens comprising the ith surface and i+1th surface; and $v_i$ is the Abbe number of the material of the lens from the ith surface to the i+1th surface.

In FIG. 1, a line segment indicates the aperture portion of the diaphragm. This is in order to clearly show the point of intersection of the diaphragm plane with the optical axis, in order to define the distance from a lens surface to the diaphragm plane. Further, in FIG. 2, FIG. 6, FIG. 10, FIG. 14, and FIG. 18, which are cross-sectional views of the pickup lenses of the firth through fifth Embodiments respectively, in contrast with the above FIG. 1, the diaphragm aperture portion is opened, and two straight lines which start at the edges of the aperture portion are used to indicate the body of the diaphragm which blocks light. This is because of the need to open the aperture portion of the diaphragm, indicating the state of the diaphragm, in order to draw the principal ray and other rays.

The optical length L is the distance from the diaphragm S1 to the pickup surface. The back focus bf is the distance along the optical axis from the image-side surface of the third lens L3 to the pickup surface.

Aspherical surface data is indicated in the respective surface number columns in Table 1 through Table 5. The planes of the diaphragm S1 and cover glass (or filters or similar) and the pickup surface are planes, and so the radius of curvature is given as infinity, ∞.

The aspherical surfaces used in this invention are described by the following equation.

$$Z=ch^2/[1+[1-(1+k)c^2h^2]^{+1/2}]+A_0h^4+B_0h^6+C_0h^8+D_0h^{10}$$

where Z is the depth from the plane tangent at the surface vertex, c is the curvature of the surface in the vicinity of the optical axis, h is the distance from the optical axis, k is the conic constant, $A_0$ is the fourth-order aspheric coefficient, $B_0$ is the sixth-order aspheric coefficient, $C_0$ is the eighth-order aspheric coefficient, and $D_0$ is the tenth-order aspheric coefficient.

In Table 1 through Table 5 in this Specification, numerical values of aspheric coefficients employ an exponent notation in which, for example, "e–1" signifies "10 to the –1 power". Also, values given as focal lengths f are combined focal lengths of the lens system comprising the first through third lenses.

Below, the first through fifth Embodiments are explained referring to FIG. 1 through FIG. 21.

The distortion aberration curves shown in FIG. 3, FIG. 7, FIG. 11, FIG. 15, and FIG. 19 show the aberration amount (the amount by which the tangent condition is not satisfied, expressed as a percentage along the horizontal axis) versus the distance from the optical axis (expressed as a percentage along the vertical axis, with the maximum distance from the optical axis within the image plane equal to 100). The astigmatic aberration curves shown in FIG. 4, FIG. 8, FIG. 12, FIG. 16, and FIG. 20 show the amounts of aberration along the horizontal axis (in mm units) for a distance from the optical axis, similarly to a distortion aberration curve. Astigmatism is represented as aberration amounts (in mm units) in the meridional plane and in the sagittal plane. The chromatic/spherical aberration curves shown in FIG. 5, FIG. 9, FIG. 13, FIG. 17, FIG. and FIG. 21 show the amount of aberration along the horizontal axis (in mm units) for a distance of incidence h (F number) along the vertical axis.

In a chromatic/spherical aberration curve, aberration amounts are shown for the C line (light of wavelength 656.3 nm), the d line (light of wavelength 587.6 nm), the e line (light of wavelength 546.1 nm), the F line (light of wavelength 486.1 nm), and the g line (light of wavelength 435.8 nm). The refractive index is the refractive index for the d line (light of wavelength 587.6 nm).

Below, the radii of curvature of component lenses (mm units), intervals between lens surfaces (mm units), refractive indices of lens materials, Abbe numbers of lens materials, focal lengths, F numbers, and aspheric coefficients are listed for the firth through fifth Embodiments in Table 1 through Table 5. In Table 1 through Table 5, the focal lengths of the first lens L1, second lens L2 and third lens L3 are indicated by $f_1$, $f_2$ and $f_3$ respectively. In all cases in the first through fifth Embodiments, $f_1$ is positive, and $f_2$ and $f_3$ are negative. That is, the first lens L1 is a lens having positive refractive power, and the second lens L2 and third lens L3 are lenses having negative refractive power. The values of the combined focal length f of the pickup lenses are normalized to 1.00 mm.

The radii of curvature at the optical axis $r_i$ (i=1, 2, 3, ..., 10) are positive values when the shape is convex on the object side, and negative values when the shape is convex on the image side. From the signs of the values of the radii of curvature of the surfaces comprising the lenses, it is possible to ascertain that the first lens L1 is a convex lens having convex surfaces on the object side and on the image side, that the second lens L2 is a meniscus lens having a convex surface on the image side, and that the third lens L3 is a meniscus lens having a convex surface on the object side.

Below, characteristics of each of the embodiments are described. In the first through fifth Embodiments, ZEONEX E48R (ZEONEX is a registered trademark, and E48R is a product number, of Nippon Zeon Co., Ltd.), which is a cycloolefin plastic, was employed in the first lens L1 and third lens L3. Polycarbonate was used as the material of the second lens L2.

The refractive index of Zeonex E48R for the d line is 1.5300, and the refractive index of polycarbonate for the d line is 1.5830. Further, the Abbe number of Zeonex E48R is 56.0, and the Abbe number of polycarbonate is 30.0.

Both surfaces of the first lens L1, second lens L2, and third lens L3 are aspherical.

As shown in FIG. 1, the pickup lens of the invention comprises an aperture diaphragm S1, first lens L1, second lens L2, and third lens L3, and is configured by arranging, in order from the object side toward the image side, the aperture diaphragm S1, first lens L1, second lens L2, and third lens L3. Cover glass 12 is inserted between the third lens L3 and the image pickup element 10. The material of the cover glass is BK7 glass, having a refractive index of 1.5613 and Abbe number of 61.

TABLE 1

First Embodiment

| Radius of Curvature($r_i$) | Interval($d_i$) | Refractive Index($N_i$) | Abbe Number($v_i$) | Aspheric Coefficients | | | | |
|---|---|---|---|---|---|---|---|---|
| | | | | K | $A_0$ | $B_0$ | $C_0$ | $D_0$ |
| $r_1 = \infty$ | | | | | | | | |
| | $d_1 = 0.0000$ | | | | | | | |
| $r_2 = 0.297$ | | | | −2.393 | 8.197 | 1.583e+2 | −3.900e+3 | −2.127e+5 |
| | $d_2 = 0.1598$ | $N_2 = 1.5300$ | $v_2 = 56.0$ | | | | | |
| $r_3 = 5.941$ | | | | −1.262e+4 | −6.960 | 4.575e+2 | −4.955e+4 | 5.859e+5 |
| | $d_3 = 0.1020$ | | | | | | | |
| $r_4 = -0.282$ | | | | −3.098e−1 | −4.549 | 3.957e+2 | −1.824e+3 | −1.402e+6 |
| | $d_4 = 0.1096$ | $N_4 = 1.5830$ | $v_4 = 30.0$ | | | | | |
| $r_5 = -0.717$ | | | | −3.812 | −2.444e+1 | 1.739e+3 | −3.640e+4 | 2.781e+5 |
| | $d_5 = 0.0874$ | | | | | | | |
| $r_6 = 0.466$ | | | | −4.030e+1 | −2.432e+1 | 2.144e+2 | 2.636e+3 | −5.613e+4 |
| | $d_6 = 0.1811$ | $N_6 = 1.5300$ | $v_6 = 56.0$ | | | | | |
| $r_7 = 0.382$ | | | | −2.218e+1 | −9.772 | 2.198e+1 | 5.203e+2 | −3.969e+3 |
| | $d_7 = 0.2125$ | | | | | | | |
| $r_8 = \infty$ | | | | | | | | |
| | $d_8 = 0.0700$ | $N_8 = 1.5613$ | $v_8 = 61.0$ | | | | | |
| $r_9 = \infty$ | | | | | | | | |
| | $d_9 = 0.1000$ | | | | | | | |
| $r_{10} = \infty$ | | | | | | | | |

Focal Length f = 1.00 mm
F Number $F_{no}$ = 3.4
Image Height 2Y = 1.18 mm
$f_1$ = 0.58 mm
$f_2$ = −0.88 mm
$f_3$ = −15.87 mm

TABLE 2

Second Embodiment

| Radius of Curvature($r_i$) | Interval($d_i$) | Refractive Index($N_i$) | Abbe Number($v_i$) | Aspheric Coefficients | | | | |
|---|---|---|---|---|---|---|---|---|
| | | | | K | $A_0$ | $B_0$ | $C_0$ | $D_0$ |
| $r_1 = \infty$ | | | | | | | | |
| | $d_1 = 0.0000$ | | | | | | | |
| $r_2 = 0.323$ | | | | 1.887 | −7.608 | −3.059e+2 | 8.501e+3 | −4.346e+5 |
| | $d_2 = 0.1734$ | $N_2 = 1.5300$ | $v_2 = 56.0$ | | | | | |
| $r_3 = 32.244$ | | | | 8.700e+3 | −6.640 | −2.002e+1 | −8.596e+3 | 1.914e+4 |
| | $d_3 = 0.1108$ | | | | | | | |
| $r_4 = -0.262$ | | | | 7.258e−1 | 1.783e+1 | 1.198e+2 | 4.605e+2 | −1.915e+5 |
| | $d_4 = 0.1194$ | $N_4 = 1.5830$ | $v_4 = 30.0$ | | | | | |
| $r_5 = -0.458$ | | | | −1.576 | 5.025 | 4.861e+2 | −6.363e+3 | 3.269e+4 |
| | $d_5 = 0.0949$ | | | | | | | |
| $r_6 = 0.801$ | | | | −8.667e+1 | −6.804 | 6.190e+1 | −1.669e+2 | 7.221e+1 |
| | $d_6 = 0.1968$ | $N_6 = 1.5300$ | $v_6 = 56.0$ | | | | | |
| $r_7 = 0.525$ | | | | −2.194e+1 | −5.414 | 2.353e+1 | −1.135e+2 | 2.131e+2 |
| | $d_7 = 0.2024$ | | | | | | | |
| $r_8 = \infty$ | | | | | | | | |
| | $d_8 = 0.0700$ | $N_8 = 1.5613$ | $v_8 = 61.0$ | | | | | |
| $r_9 = \infty$ | | | | | | | | |
| | $d_9 = 0.1000$ | | | | | | | |
| $r_{10} = \infty$ | | | | | | | | |

Focal Length f = 1.00 mm
F Number $F_{no}$ = 3.4
Image Height 2Y = 1.18 mm
$f_1$ = 0.61 mm
$f_2$ = −1.35 mm
$f_3$ = −3.82 mm

TABLE 3

Third Embodiment

| Radius of Curvature($r_i$) | Interval($d_i$) | Refractive Index($N_i$) | Abbe Number($v_i$) | Aspheric Coefficients ||||  |
|---|---|---|---|---|---|---|---|---|
| | | | | K | $A_0$ | $B_0$ | $C_0$ | $D_0$ |
| $r_1 = \infty$ | | | | | | | | |
| | $d_1 = 0.0000$ | | | | | | | |
| $r_2 = 0.326$ | | | | 1.680 | −5.758 | −3.168e+2 | 8.641e+3 | −3.665e+5 |
| | $d_2 = 0.1751$ | $N_2 = 1.5300$ | $v_2 = 56.0$ | | | | | |
| $r_3 = 20.315$ | | | | 8.700e+3 | −6.863 | −1.830e+2 | −1.781e+3 | −1.637e+5 |
| | $d_3 = 0.1118$ | | | | | | | |
| $r_4 = -0.225$ | | | | 4.680e−1 | 1.747e+1 | 5.233e+2 | −1.717e+4 | 1.897e+5 |
| | $d_4 = 0.1201$ | $N_4 = 1.5830$ | $v_4 = 30.0$ | | | | | |
| $r_5 = -0.360$ | | | | −1.590 | 3.701 | 4.750e+2 | −6.469e+3 | 3.424e+4 |
| | $d_5 = 0.0958$ | | | | | | | |
| $r_6 = 0.877$ | | | | −1.100e+2 | −4.253 | 4.205e+1 | −2.914e+2 | 8.348e+2 |
| | $d_6 = 0.1984$ | $N_6 = 1.5300$ | $v_6 = 56.0$ | | | | | |
| $r_7 = 0.612$ | | | | −3.100e+1 | −4.098 | 8.566 | −4.905 | −1.436e+2 |
| | $d_7 = 0.2256$ | | | | | | | |
| $r_8 = \infty$ | | | | | | | | |
| | $d_8 = 0.0700$ | $N_8 = 1.5613$ | $v_8 = 61.0$ | | | | | |
| $r_9 = \infty$ | | | | | | | | |
| | $d_9 = 0.1000$ | | | | | | | |
| $r_{10} = \infty$ | | | | | | | | |

Focal Length f = 1.00 mm
F Number $F_{no}$ = 3.4
Image Height 2Y = 1.20 mm
$f_1$ = 0.62 mm
$f_2$ = −1.52 mm
$f_3$ = −5.17 mm

TABLE 4

Fourth Embodiment

| Radius of Curvature($r_i$) | Interval($d_i$) | Refractive Index($N_i$) | Abbe Number($v_i$) | Aspheric Coefficients ||||  |
|---|---|---|---|---|---|---|---|---|
| | | | | K | $A_0$ | $B_0$ | $C_0$ | $D_0$ |
| $r_1 = \infty$ | | | | | | | | |
| | $d_1 = 0.0000$ | | | | | | | |
| $r_2 = 0.302$ | | | | 8.851e−1 | −4.139 | −2.843e+2 | 1.065e+4 | −3.831e+5 |
| | $d_2 = 0.1735$ | $N_2 = 1.5300$ | $v_2 = 56.0$ | | | | | |
| $r_3 = 20.172$ | | | | 1.659e+4 | −8.958 | −2.657e+2 | 7.210e+2 | −3.547e+5 |
| | $d_3 = 0.1004$ | | | | | | | |
| $r_4 = -0.223$ | | | | 5.842e−1 | 1.845e+1 | 4.084e+2 | −1.666e+4 | 1.861e+5 |
| | $d_4 = 0.1195$ | $N_4 = 1.5830$ | $v_4 = 30.0$ | | | | | |
| $r_5 = -0.382$ | | | | −2.657 | 5.210 | 4.766e+2 | −5.852e+3 | 3.119e+4 |
| | $d_5 = 0.0949$ | | | | | | | |
| $r_6 = 1.237$ | | | | −2.408e+2 | −5.327 | 4.000e+1 | −2.132e+1 | −3.017e+2 |
| | $d_6 = 0.1968$ | $N_6 = 1.5300$ | $v_6 = 56.0$ | | | | | |
| $r_7 = 0.716$ | | | | −4.156e+1 | −5.056 | 1.571e+1 | −7.268e+1 | 1.257e+2 |
| | $d_7 = 0.2128$ | | | | | | | |
| $r_8 = \infty$ | | | | | | | | |
| | $d_8 = 0.0700$ | $N_8 = 1.5613$ | $v_8 = 61.0$ | | | | | |
| $r_9 = \infty$ | | | | | | | | |
| | $d_9 = 0.1000$ | | | | | | | |
| $r_{10} = \infty$ | | | | | | | | |

Focal Length f = 1.00 mm
F Number $F_{no}$ = 3.4
Image Height 2Y = 1.18 mm
$f_1$ = 0.58 mm
$f_2$ = −1.27 mm
$f_3$ = −3.70 mm

TABLE 5

Fifth Embodiment

| Radius of Curvature($r_i$) | Interval($d_i$) | Refractive Index($N_i$) | Abbe Number($v_i$) | Aspheric Coefficients | | | | |
|---|---|---|---|---|---|---|---|---|
| | | | | K | $A_0$ | $B_0$ | $C_0$ | $D_0$ |
| $r_1 = \infty$ | | | | | | | | |
| | $d_1 = 0.0000$ | | | | | | | |
| $r_2 = 0.323$ | | | | 1.621e−1 | −1.734 | −2.506e+2 | 1.166e+4 | −4.081e+5 |
| | $d_2 = 0.1734$ | $N_2 = 1.5300$ | $v_2 = 56.0$ | | | | | |
| $r_3 = 20.179$ | | | | 1.696e+4 | −1.072e+1 | −1.854e+2 | −3.774e+3 | −1.852e+5 |
| | $d_3 = 0.1499$ | | | | | | | |
| $r_4 = -0.205$ | | | | −1.014 | −2.824e+1 | 2.532e+2 | 1.074e+4 | −7.197e+5 |
| | $d_4 = 0.1195$ | $N_4 = 1.5830$ | $v_4 = 30.0$ | | | | | |
| $r_5 = -0.299$ | | | | −1.800 | −1.652e+1 | 3.899e+2 | 4.845e+3 | −6.267e+4 |
| | $d_5 = 0.0950$ | | | | | | | |
| $r_6 = 2.499$ | | | | −7.346e+1 | −2.511e+1 | 3.913e+2 | −3.154e+3 | 1.051e+4 |
| | $d_6 = 0.1969$ | $N_6 = 1.5300$ | $v_6 = 56.0$ | | | | | |
| $r_7 = 0.789$ | | | | −2.751e−1 | −1.549e+1 | 9.370e+1 | −3.094e+2 | 7.308e+1 |
| | $d_7 = 0.1651$ | | | | | | | |
| $r_8 = \infty$ | | | | | | | | |
| | $d_8 = 0.0700$ | $N_8 = 1.5613$ | $v_8 = 61.0$ | | | | | |
| $r_9 = \infty$ | | | | | | | | |
| | $d_9 = 0.1000$ | | | | | | | |
| $r_{10} = \infty$ | | | | | | | | |

Focal Length f = 1.00 mm
F Number $F_{no}$ = 3.4
Image Height 2Y = 1.18 mm
$f_1$ = 0.62 mm
$f_2$ = −2.09 mm
$f_3$ = −2.27 mm First Embodiment Zeonex E48R was used as the material of the first lens L1 and third lens L3, while polycarbonate was used as the material of the second lens L2.

(A) The focal length $f_1$ of the first lens L1 is $f_1$=0.58 mm.
(B) The object-side radius of curvature $r_2$ of the first lens L1 is $r_2$=0.297 mm.
(C) The image-side radius of curvature $r_3$ of the first lens L1 is $r_3$=5.941 mm.
(D) The interval D along the optical axis between the second lens L2 and the third lens L3 is $d_3$=0.1020 mm.
(E) The optical length L is L=0.997 mm.
(F) The image height (length of the diagonal line in the rectangular light-receiving area) 2Y is 2Y=1.18 mm.
Hence:

$$f_1/f=0.58/1.00=0.58 \quad (1)$$

$$r_2/r_3=0.297/5.941=0.0500 \quad (2)$$

$$d_3/f=0.1020/1.00=0.1020 \quad (3)$$

$$L/2Y=0.997/1.18=0.8449 \quad (4)$$

Hence the lens system of the first Embodiment satisfies each of the following condition equations (1) to (4).

$$0.57<f_1/f<0.65 \quad (1)$$

$$0.01 \leq r_2/r_3 \leq 0.05 \quad (2)$$

$$0.1 \leq d_3/f<0.15 \quad (3)$$

$$0.6<L/2Y<0.9 \quad (4)$$

In the following, the condition equations of the invention are taken to refer to the above four equations (1) to (4).

As shown in Table 1, the diaphragm S1 is provided at the position of the point of intersection of the first surface (object-side surface) of the first lens L1 with the optical axis. That is, because the diaphragm surface is planar, in Table 1 $r_1$=∞, and so the diaphragm S1 is placed at the position of the plane $r_1$. The F number is 3.4.

FIG. 2 is a cross-sectional view of the pickup lens of the first Embodiment. A sufficiently long back focus relative to the 1.00 mm focal length of 0.357 mm is secured.

Figure 4:
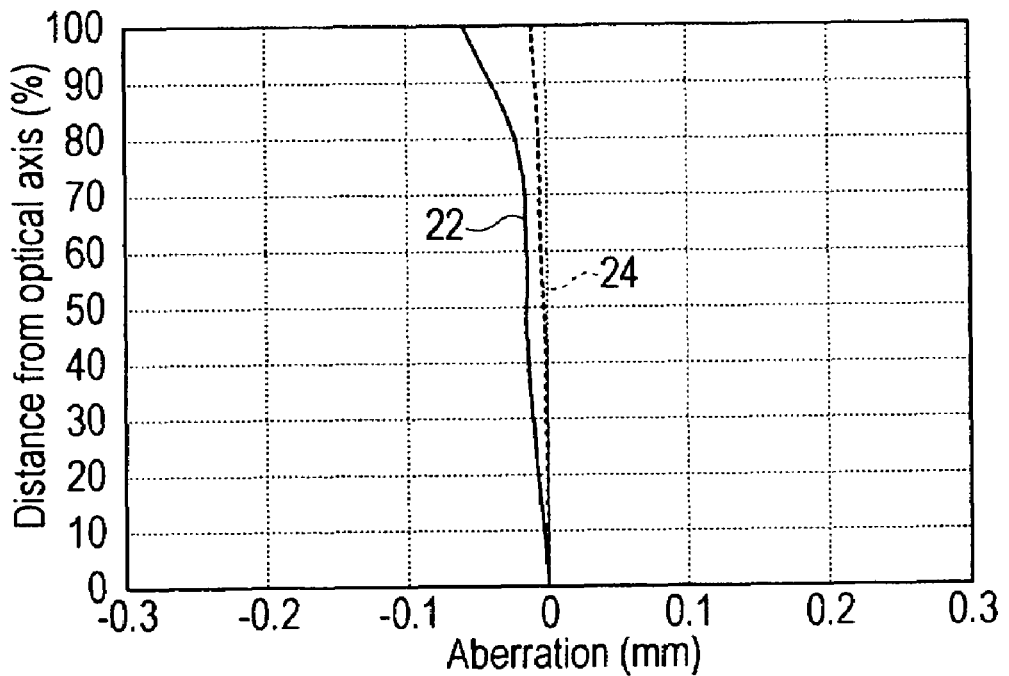
FIG. 4 is a diagram of astigmatic aberration of the pickup lens of the first Embodiment.
Figure 5:
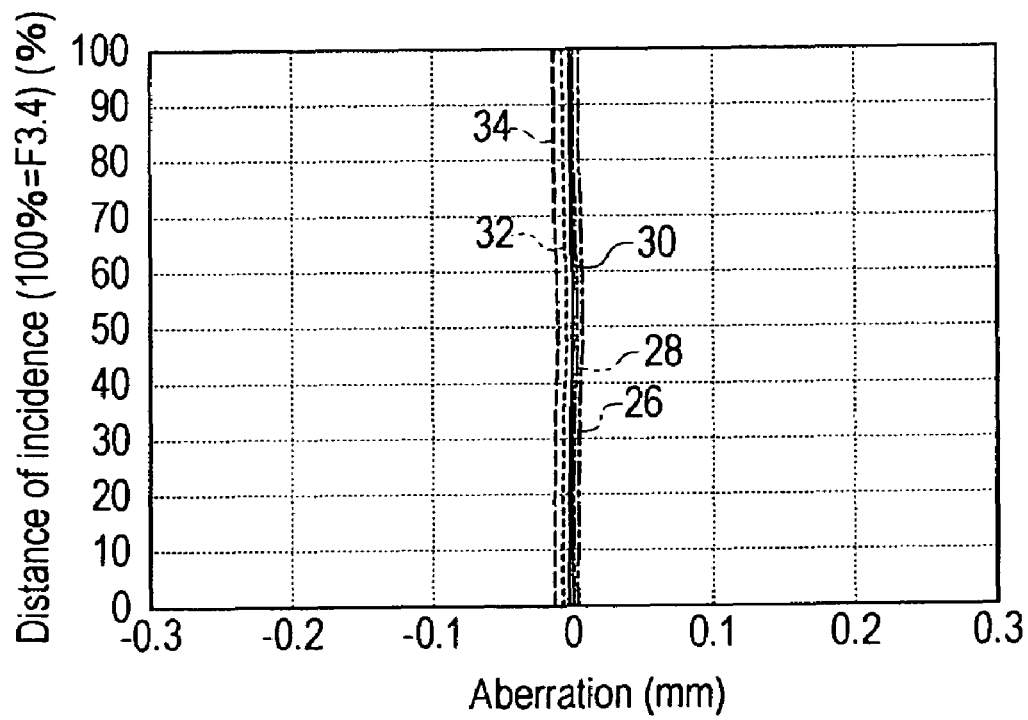
FIG. 5 is a diagram of the chromatic/spherical aberration of the pickup lens of the first Embodiment.

FIG. 3 shows the distortion aberration curve 20, FIG. 4 shows the astigmatic aberration curves (the aberration curve 22 in the meridional plane and the aberration curve 24 in the sagittal plane), and FIG. 5 shows the chromatic/spherical aberration curves (the aberration curve 26 for the C line, aberration curve 28 for the d line, aberration curve 30 for the e line, aberration curve 32 for the F line, and aberration curve 34 for the g line).

The vertical axes of the aberration curves in FIG. 3 and FIG. 4 indicate the distance from the optical axis of the image height, as a percentage. In FIG. 3 and FIG. 4, 100% on the vertical axes corresponds to 0.590 mm. The vertical axis for the aberration curve in FIG. 5 indicates the distance of incidence h (F number); the maximum corresponds to 3.4. The horizontal axis in FIG. 3 indicates the aberration in percent; the horizontal axes in FIG. 4 and FIG. 5 indicate the aberration magnitude.

The absolute value of distortion aberration is maximum, at 1.4195%, at an image height of 60% (image height 0.354 mm). At image heights of 0.590 mm or less, the absolute value of the aberration is within 1.4195%.

The absolute value of astigmatic aberration is maximum in the meridional plane, at 0.0595 mm, at an image height of 100% (image height 0.590 mm). At image heights of 0.590 mm or less, the absolute value of the aberration is within 0.0595 mm.

The absolute value of chromatic/spherical aberration is maximum, at 0.0135 mm, for the g line of the aberration curve 34 at a distance of incidence h of 100%, and the absolute value of the aberration is within 0.0135 mm.

Second Embodiment

Zeonex E48R was used as the material of the first lens L1 and third lens L3, while polycarbonate was used as the material of the second lens L2.

(A) The focal length $f_1$ of the first lens L1 is $f_1$=0.61 mm.
(B) The object-side radius of curvature $r_2$ of the first lens L1 is $r_2$=0.323 mm.
(C) The image-side radius of curvature $r_3$ of the first lens L1 is $r_3$=32.244 mm.
(D) The interval D along the optical axis between the second lens L2 and the third lens L3 is $d_3$=0.1108 mm.
(E) The optical length L is L=1.042 mm.
(F) The image height (length of the diagonal line in the rectangular light-receiving area) 2Y is 2Y=1.18 mm.

Hence:

$$f_1/f = 0.61/1.00 = 0.61 \quad (1)$$

$$r_2/r_3 = 0.323/32.244 = 0.0100 \quad (2)$$

$$d_3/f = 0.1108/1.00 = 0.1108 \quad (3)$$

$$L/2Y = 1.042/1.18 = 0.8831 \quad (4)$$

Hence the lens system of the second Embodiment satisfies each of the following condition equations (1) to (4).

$$0.57 < f_1/f < 0.65 \quad (1)$$

$$0.01 \leq r_2/r_3 \leq 0.05 \quad (2)$$

$$0.1 \leq d_3/f < 0.15 \quad (3)$$

$$0.6 < L/2Y < 0.9 \quad (4)$$

As shown in Table 2, the diaphragm S1 is provided at the position of the point of intersection of the first surface (object-side surface) of the first lens L1 with the optical axis. That is, because the diaphragm surface is planar, in Table 2 $r_1 = \infty$, and so the diaphragm S1 is placed at the position of the plane $r_1$. The F number is 3.4.

Figure 6:
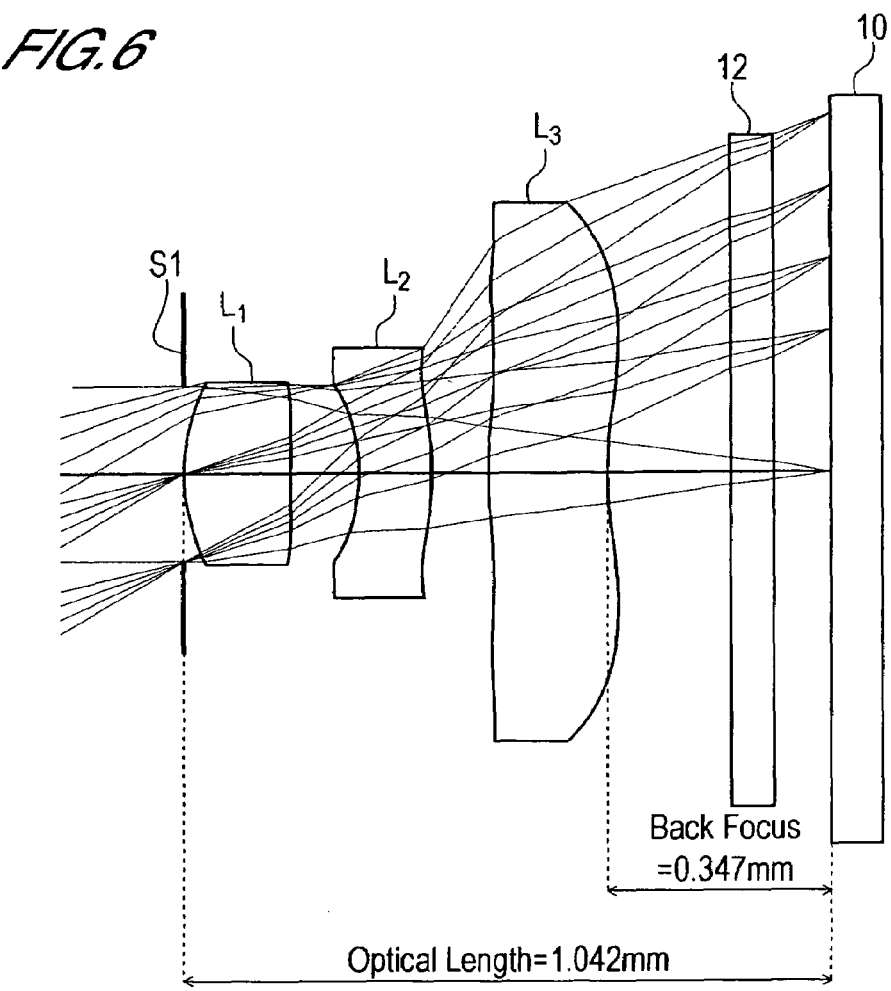
FIG. 6 is a cross-sectional view of the pickup lens of a second Embodiment.

FIG. 6 is a cross-sectional view of the pickup lens of the second Embodiment. A sufficiently long back focus relative to the 1.00 mm focal length of 0.347 mm is secured.

Figure 7:
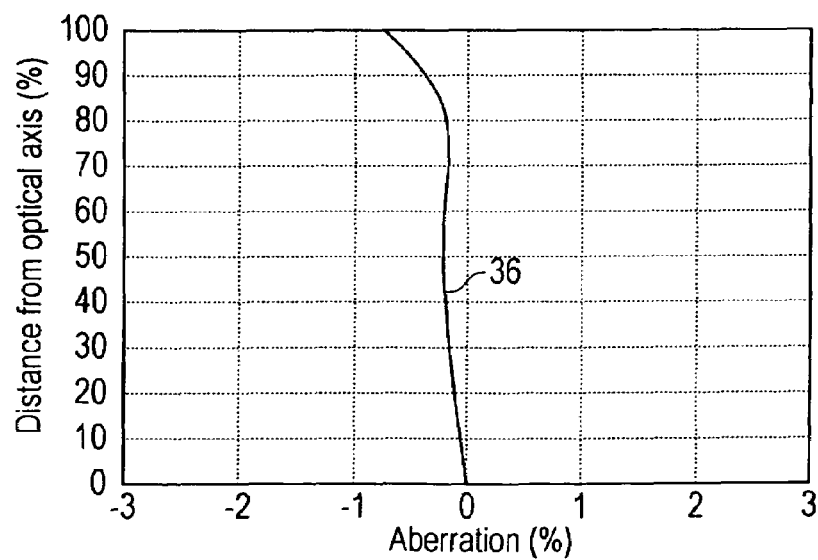
FIG. 7 is a diagram of distortion aberration of the pickup lens of the second Embodiment.
Figure 8:
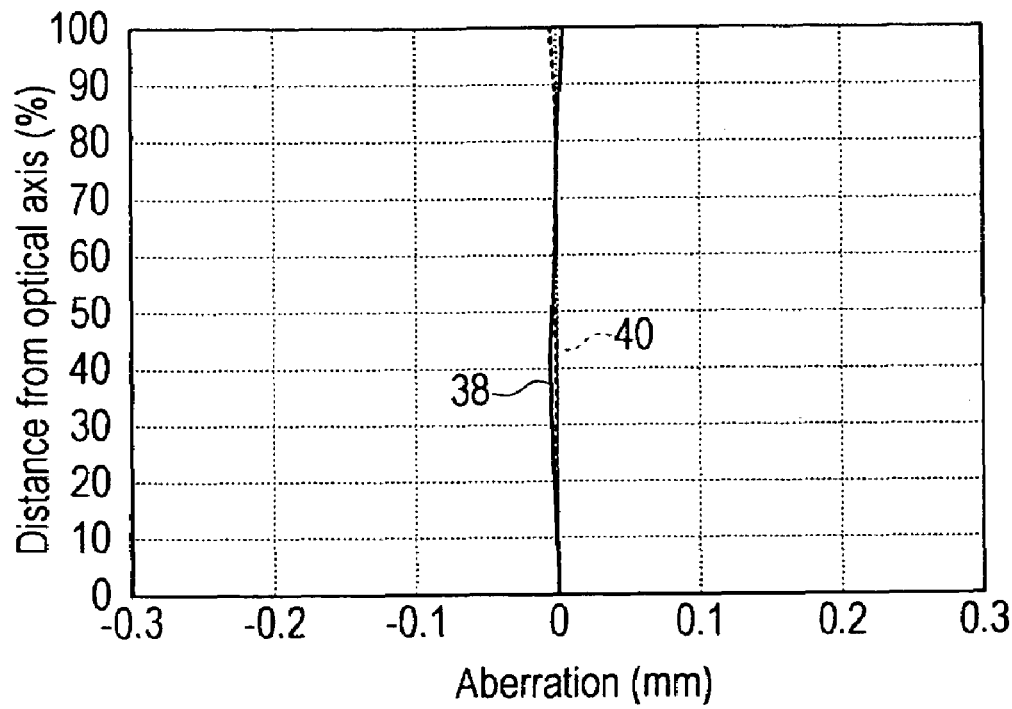
FIG. 8 is a diagram of astigmatic aberration of the pickup lens of the second Embodiment.
Figure 9:
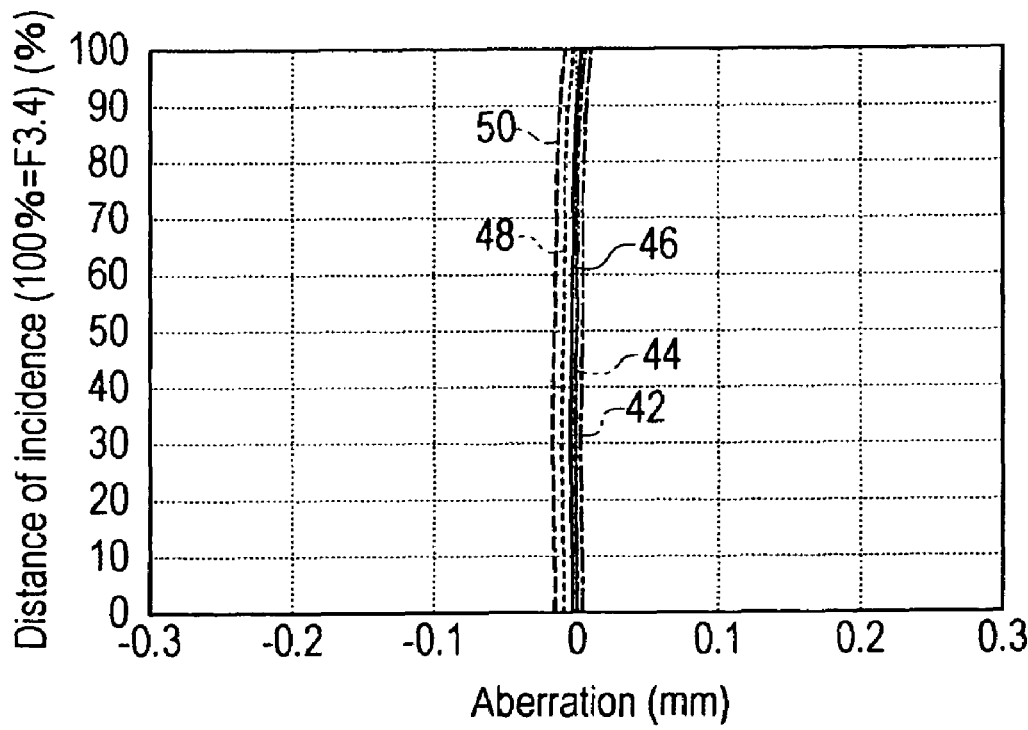
FIG. 9 is a diagram of the chromatic/spherical aberration of the pickup lens of the second Embodiment.

FIG. 7 shows the distortion aberration curve 36, FIG. 8 shows the astigmatic aberration curves (the aberration curve 38 in the meridional plane and the aberration curve 40 in the sagittal plane), and FIG. 9 shows the chromatic/spherical aberration curves (the aberration curve 42 for the C line, aberration curve 44 for the d line, aberration curve 46 for the e line, aberration curve 48 for the F line, and aberration curve 50 for the g line).

The vertical axes of the aberration curves in FIG. 7 and FIG. 8 indicate the distance from the optical axis of the image height, as a percentage. In FIG. 7 and FIG. 8, 100% on the vertical axes corresponds to 0.590 mm. The vertical axis for the aberration curve in FIG. 9 indicates the distance of incidence h (F number); the maximum corresponds to 3.4. The horizontal axis in FIG. 7 indicates the aberration in percent; the horizontal axes in FIG. 8 and FIG. 9 indicate the aberration magnitude.

The absolute value of distortion aberration is maximum, at 0.7512%, at an image height of 100% (image height 0.590 mm). At image heights of 0.590 mm or less, the absolute value of the aberration is within 0.7512%.

The absolute value of astigmatic aberration is maximum in the sagittal plane, at 0.0046 mm, at an image height of 100% (image height 0.590 mm). At image heights of 0.590 mm or less, the absolute value of the aberration is within 0.0046 mm.

The absolute value of chromatic/spherical aberration is maximum, at 0.0168 mm, for the g line of the aberration curve 50 at a distance of incidence h of 30%, and the absolute value of the aberration is within 0.0168 mm.

Third Embodiment

Zeonex E48R was used as the material of the first lens L1 and third lens L3, while polycarbonate was used as the material of the second lens L2.

(A) The focal length $f_1$ of the first lens L1 is $f_1$=0.62 mm.
(B) The object-side radius of curvature $r_2$ of the first lens L1 is $r_2$=0.326 mm.
(C) The image-side radius of curvature $r_3$ of the first lens L1 is $r_3$=20.315 mm.
(D) The interval D along the optical axis between the second lens L2 and the third lens L3 is $d_3$=0.1118 mm.
(E) The optical length L is L=1.071 mm.
(F) The image height (length of the diagonal line in the rectangular light-receiving area) 2Y is 2Y=1.20 mm.

Hence:

$$f_1/f = 0.62/1.00 = 0.62 \quad (1)$$

$$r_2/r_3 = 0.326/20.315 = 0.0160 \quad (2)$$

$$d_3/f = 0.1118/1.00 = 0.1118 \quad (3)$$

$$L/2Y = 1.071/1.20 = 0.8925 \quad (4)$$

Hence the lens system of the third Embodiment satisfies each of the following condition equations (1) to (4).

$$0.57 < f_1/f < 0.65 \quad (1)$$

$$0.01 \leq r_2/r_3 \leq 0.05 \quad (2)$$

$$0.1 \leq d_3/f < 0.15 \quad (3)$$

$$0.6 < L/2Y < 0.9 \quad (4)$$

As shown in Table 3, the diaphragm S1 is provided at the position of the point of intersection of the first surface (object-side surface) of the first lens L1 with the optical axis. That is, because the diaphragm surface is planar, in Table 3 $r_1 = \infty$, and so the diaphragm S1 is placed at the position of the plane $r_1$. The F number is 3.4.

Figure 10:
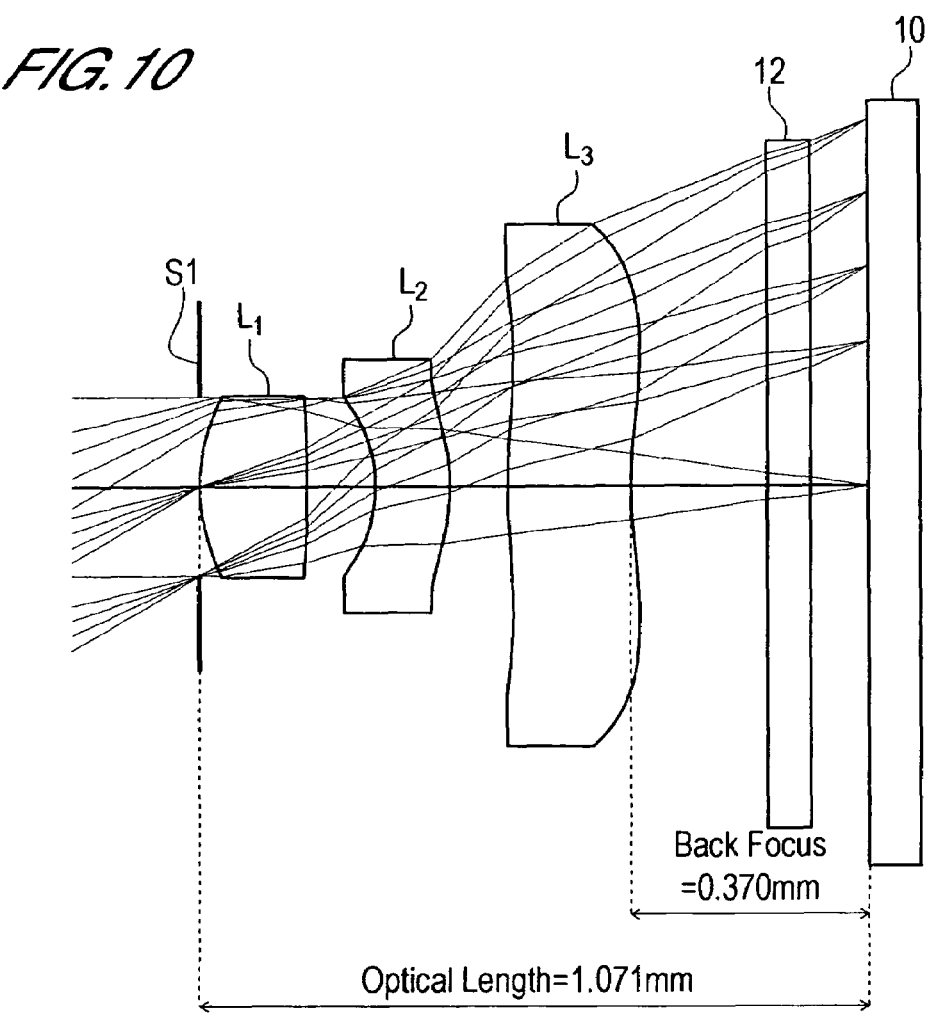
FIG. 10 is a cross-sectional view of the pickup lens of a third Embodiment.

FIG. 10 is a cross-sectional view of the pickup lens of the third Embodiment. A sufficiently long back focus relative to the 1.00 mm focal length of 0.37 mm is secured.

Figure 11:
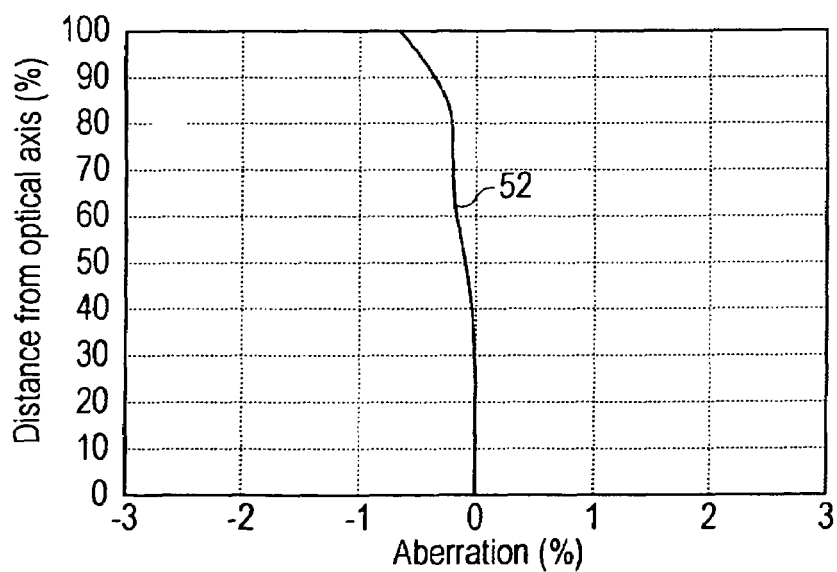
FIG. 11 is a diagram of distortion aberration of the pickup lens of the third Embodiment.
Figure 12:
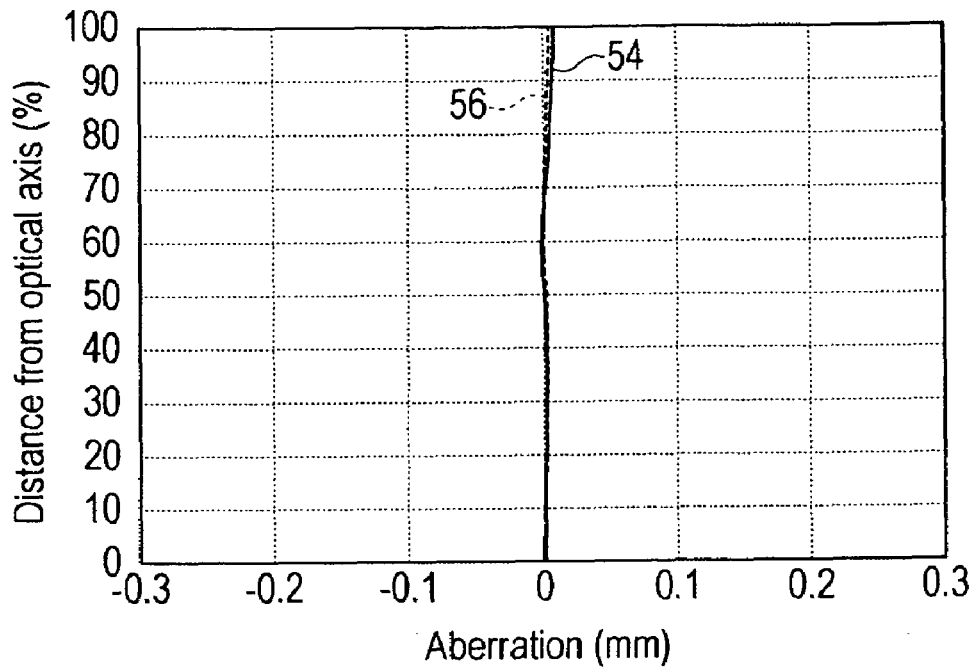
FIG. 12 is a diagram of astigmatic aberration of the pickup lens of the third Embodiment.
Figure 13:
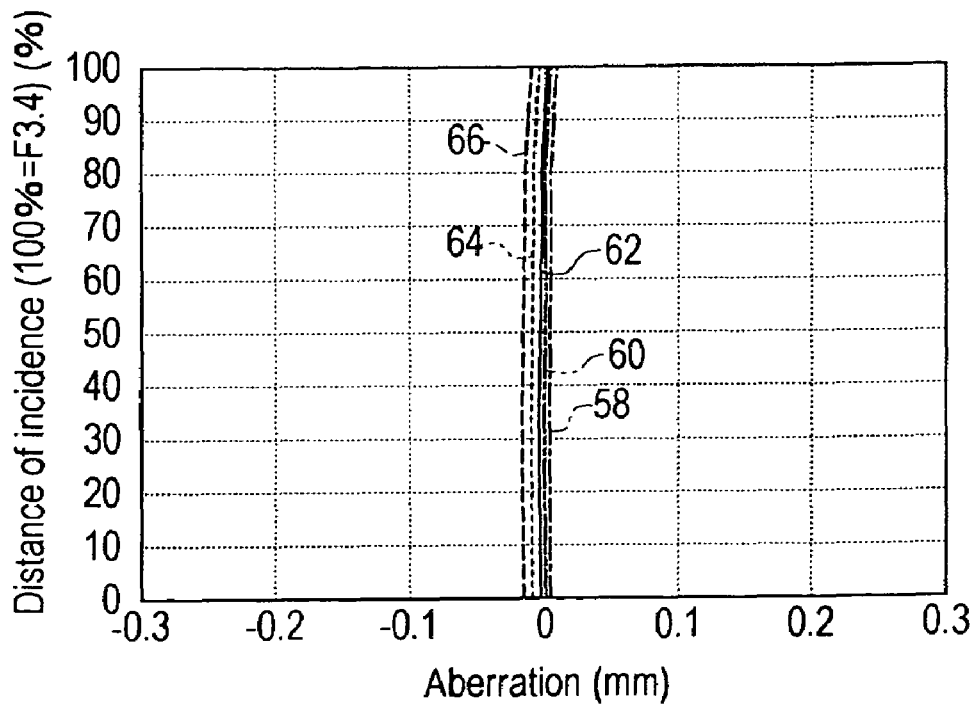
FIG. 13 is a diagram of the chromatic/spherical aberration of the pickup lens of the third Embodiment.

FIG. 11 shows the distortion aberration curve 52, FIG. 12 shows the astigmatic aberration curves (the aberration curve 54 in the meridional plane and the aberration curve 56 in the sagittal plane), and FIG. 13 shows the chromatic/spherical aberration curves (the aberration curve 58 for the C line, aberration curve 60 for the d line, aberration curve 62 for the e line, aberration curve 64 for the F line, and aberration curve 66 for the g line).

The vertical axes of the aberration curves in FIG. 11 and FIG. 12 indicate the distance from the optical axis of the image height, as a percentage. In FIG. 11 and FIG. 12, 100% on the vertical axes corresponds to 0.600 mm. The vertical axis for the aberration curve in FIG. 13 indicates the distance of incidence h (F number); the maximum corresponds to 3.4. The horizontal axis in FIG. 11 indicates the aberration in percent; the horizontal axes in FIG. 12 and FIG. 13 indicate the aberration magnitude.

The absolute value of distortion aberration is maximum, at 0.6561%, at an image height of 100% (image height 0.600 mm). At image heights of 0.600 mm or less, the absolute value of the aberration is within 0.6561%.

The absolute value of astigmatic aberration is maximum in the meridional plane, at 0.0079 mm, at an image height of 100% (image height 0.600 mm). At image heights of 0.600 mm or less, the absolute value of the aberration is within 0.0079 mm.

The absolute value of chromatic/spherical aberration is maximum, at 0.0173 mm, for the g line of the aberration curve 66 at a distance of incidence h of 30%, and the absolute value of the aberration is within 0.0173 mm.

Fourth Embodiment

Zeonex E48R was used as the material of the first lens L1 and third lens L3, while polycarbonate was used as the material of the second lens L2.

(A) The focal length $f_1$ of the first lens L1 is $f_1 = 0.58$ mm.
(B) The object-side radius of curvature $r_2$ of the first lens L1 is $r_2 = 0.302$ mm.
(C) The image-side radius of curvature $r_3$ of the first lens L1 is $r_3 = 20.172$ mm.
(D) The interval D along the optical axis between the second lens L2 and the third lens L3 is $d_3 = 0.1004$ mm.
(E) The optical length L is L=1.043 mm.
(F) The image height (length of the diagonal line in the rectangular light-receiving area) 2Y is 2Y=1.18 mm.

Hence:

$$f_1/f = 0.58/1.00 = 0.58 \quad (1)$$

$$r_2/r_3 = 0.302/20.172 = 0.0150 \quad (2)$$

$$d_3/f = 0.1004/1.00 = 0.1004 \quad (3)$$

$$L/2Y = 1.043/1.18 = 0.8839 \quad (4)$$

Hence the lens system of the fourth Embodiment satisfies each of the following condition equations (1) to (4).

$$0.57 < f_1/f < 0.65 \quad (1)$$

$$0.01 \leq r_2/r_3 \leq 0.05 \quad (2)$$

$$0.1 \leq d_3/f < 0.15 \quad (3)$$

$$0.6 < L/2Y < 0.9 \quad (4)$$

As shown in Table 4, the diaphragm S1 is provided at the position of the point of intersection of the first surface (object-side surface) of the first lens L1 with the optical axis. That is, because the diaphragm surface is planar, in Table 4 $r_1 = \infty$, and so the diaphragm S1 is placed at the position of the plane $r_1$. The F number is 3.4.

Figure 14:
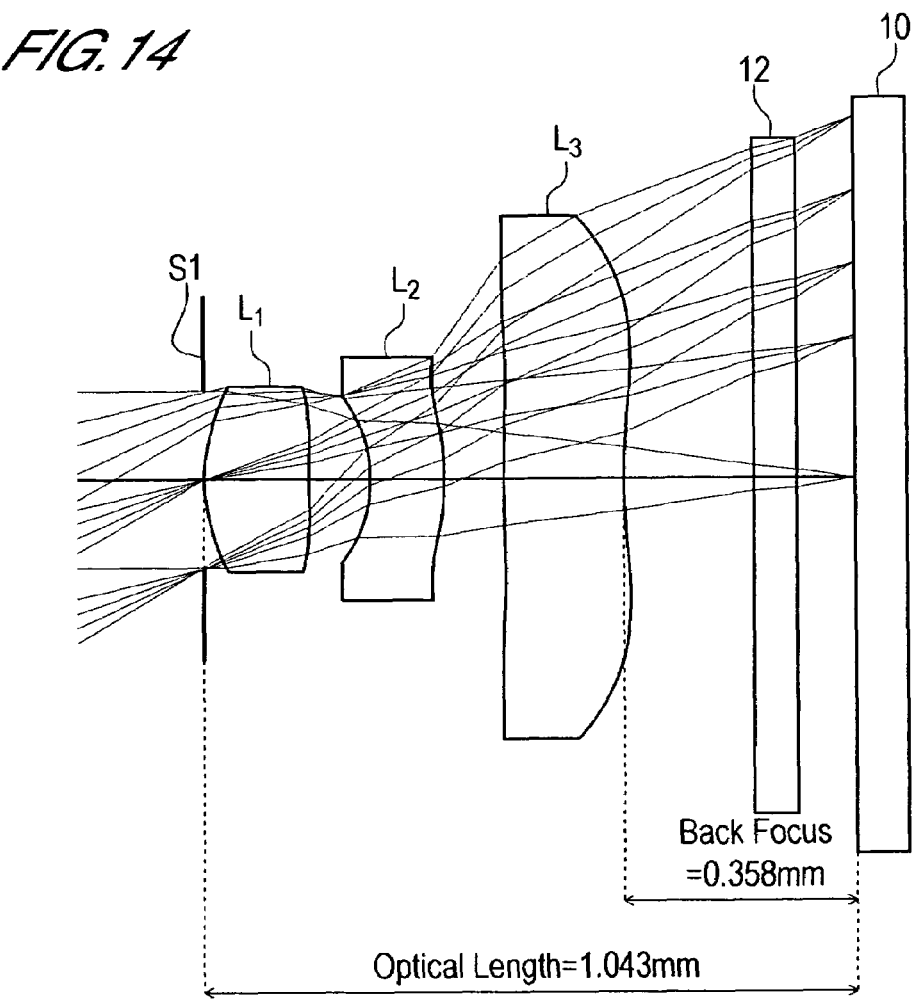
FIG. 14 is a cross-sectional view of the pickup lens of a fourth Embodiment.

FIG. 14 is a cross-sectional view of the pickup lens of the fourth Embodiment. A sufficiently long back focus relative to the 1.00 mm focal length of 0.358 mm is secured.

Figure 15:
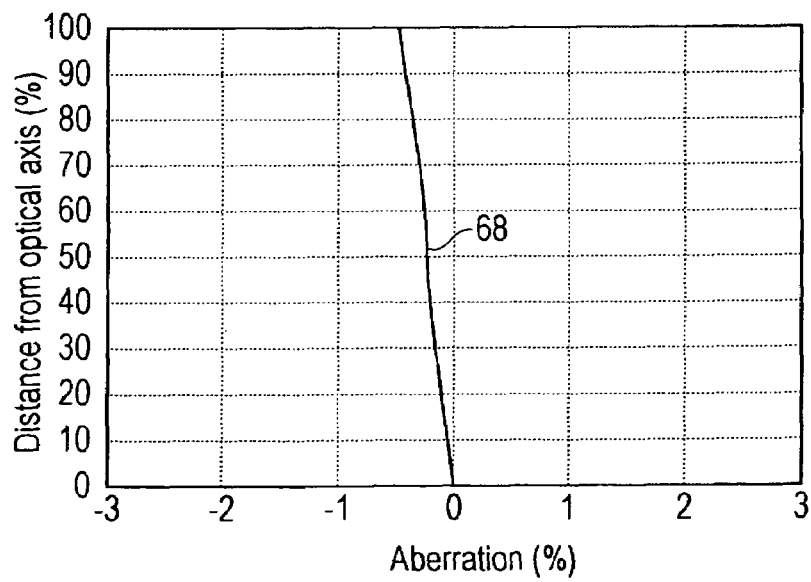
FIG. 15 is a diagram of distortion aberration of the pickup lens of the fourth Embodiment.
Figure 16:
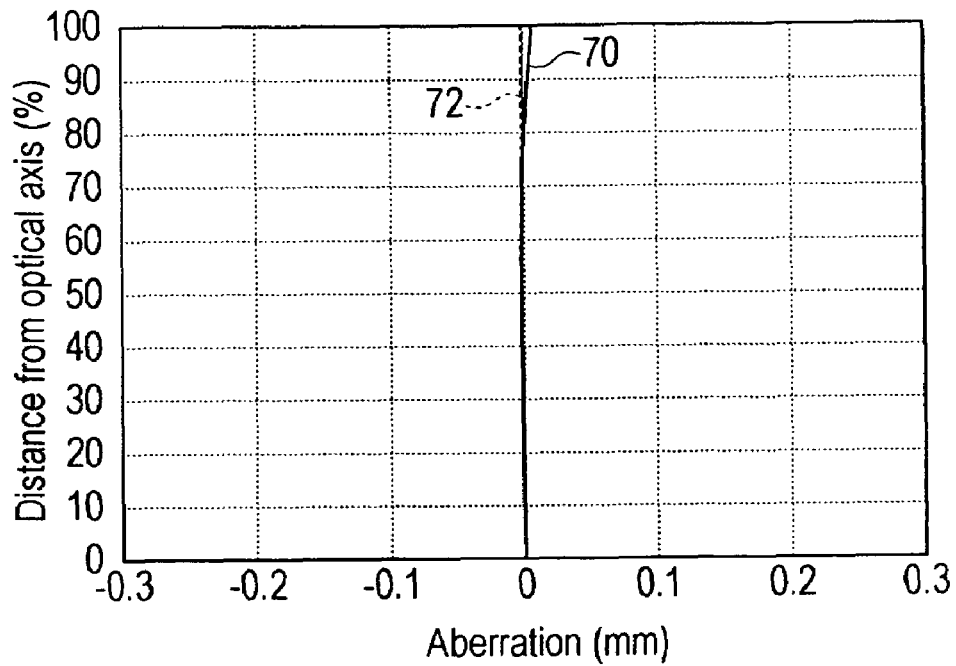
FIG. 16 is a diagram of astigmatic aberration of the pickup lens of the fourth Embodiment.
Figure 17:
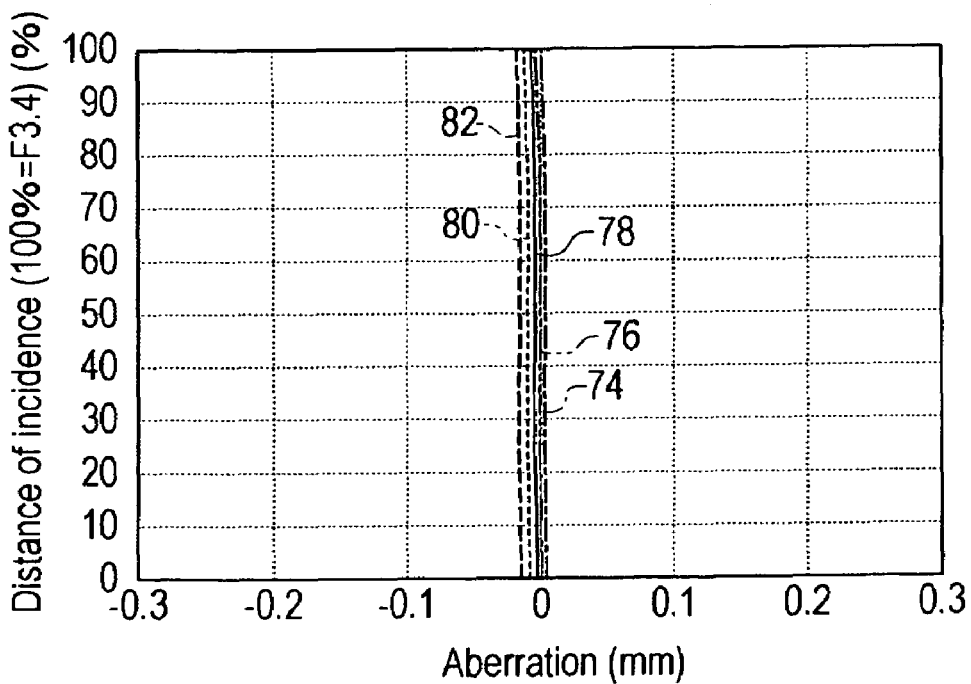
FIG. 17 is a diagram of the chromatic/spherical aberration of the pickup lens of the fourth Embodiment.

FIG. 15 shows the distortion aberration curve 68, FIG. 16 shows the astigmatic aberration curves (the aberration curve 70 in the meridional plane and the aberration curve 72 in the sagittal plane), and FIG. 17 shows the chromatic/spherical aberration curves (the aberration curve 74 for the C line, aberration curve 76 for the d line, aberration curve 78 for the e line, aberration curve 80 for the F line, and aberration curve 82 for the g line).

The vertical axes of the aberration curves in FIG. 15 and FIG. 16 indicate the distance from the optical axis of the image height, as a percentage. In FIG. 15 and FIG. 16, 100% on the vertical axes corresponds to 0.590 mm. The vertical axis for the aberration curve in FIG. 17 indicates the distance of incidence h (F number); the maximum corresponds to 3.4.

The horizontal axis in FIG. 15 indicates the aberration in percent; the horizontal axes in FIG. 16 and FIG. 17 indicate the aberration magnitude.

The absolute value of distortion aberration is maximum, at 0.4874%, at an image height of 100% (image height 0.590 mm). At image heights of 0.590 mm or less, the absolute value of the aberration is within 0.4874%.

The absolute value of astigmatic aberration is maximum in the meridional plane, at 0.0065 mm, at an image height of 100% (image height 0.590 mm). At image heights of 0.590 mm or less, the absolute value of the aberration is within 0.0065 mm.

The absolute value of chromatic/spherical aberration is maximum, at 0.0185 mm, for the g line of the aberration curve 82 at a distance of incidence h of 100%, and the absolute value of the aberration is within 0.0185 mm.

Fifth Embodiment

Zeonex E48R was used as the material of the first lens L1 and third lens L3, while polycarbonate was used as the material of the second lens L2.

(A) The focal length $f_1$ of the first lens L1 is $f_1 = 0.62$ mm.
(B) The object-side radius of curvature $r_2$ of the first lens L1 is $r_2 = 0.323$ mm.
(C) The image-side radius of curvature $r_3$ of the first lens L1 is $r_3 = 20.179$ mm.
(D) The interval D along the optical axis between the second lens L2 and the third lens L3 is $d_3 = 0.1499$ mm.
(E) The optical length L is L=1.045 mm.
(F) The image height (length of the diagonal line in the rectangular light-receiving area) 2Y is 2Y=1.18 mm.

Hence:

$$f_1/f = 0.62/1.00 = 0.62 \quad (1)$$

$$r_2/r_3 = 0.323/20.179 = 0.0160 \quad (2)$$

$$d_3/f = 0.1499/1.00 = 0.1499 \quad (3)$$

$$L/2Y = 1.045/1.18 = 0.8856 \quad (4)$$

Hence the lens system of the fifth Embodiment satisfies each of the following condition equations (1) to (4).

$$0.57 < f_1/f < 0.65 \quad (1)$$

$$0.01 \leq r_2/r_3 \leq 0.05 \quad (2)$$

$$0.1 \leq d_3/f < 0.15 \quad (3)$$

$$0.6 < L/2Y < 0.9 \quad (4)$$

As shown in Table 5, the diaphragm S1 is provided at the position of the point of intersection of the first surface (object-side surface) of the first lens L1 with the optical axis. That is, because the diaphragm surface is planar, in Table 5 $r_1 = \infty$, and so the diaphragm S1 is placed at the position of the plane $r_1$. The F number is 3.4.

Figure 18:
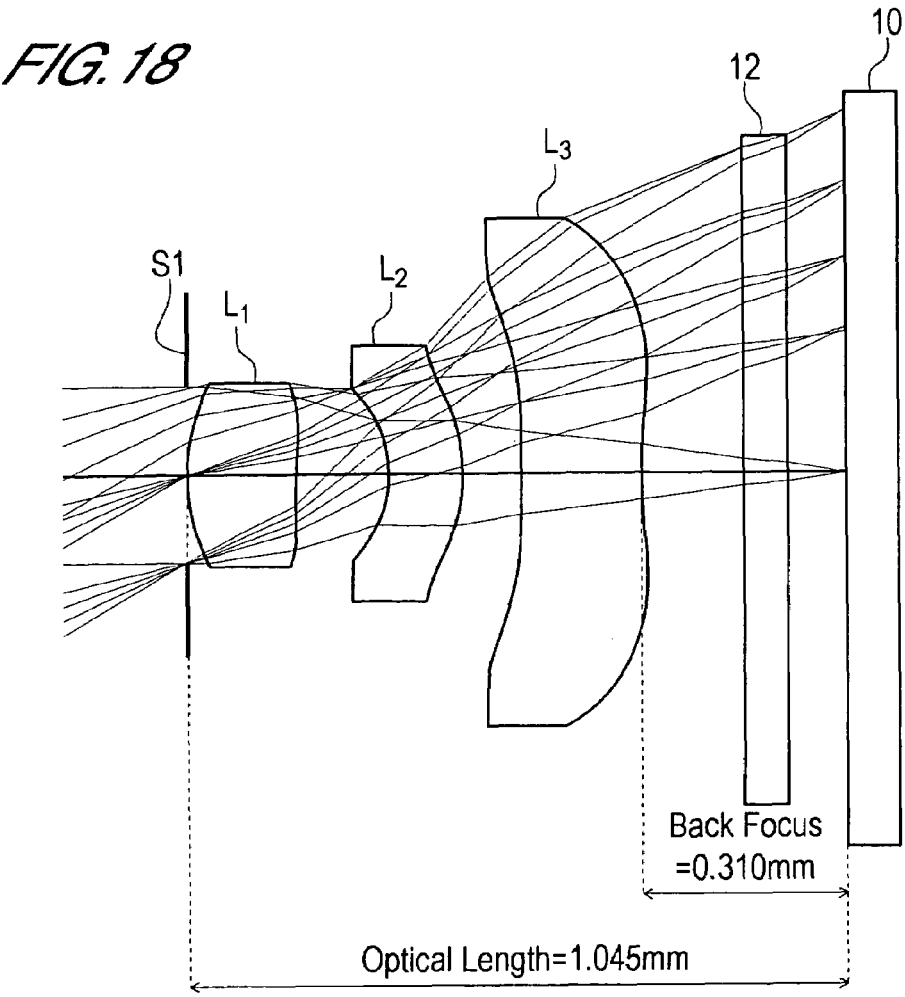
FIG. 18 is a cross-sectional view of the pickup lens of a fifth Embodiment.

FIG. 18 is a cross-sectional view of the pickup lens of the fifth Embodiment. A sufficiently long back focus relative to the 1.00 mm focal length of 0.310 mm is secured.

Figure 19:
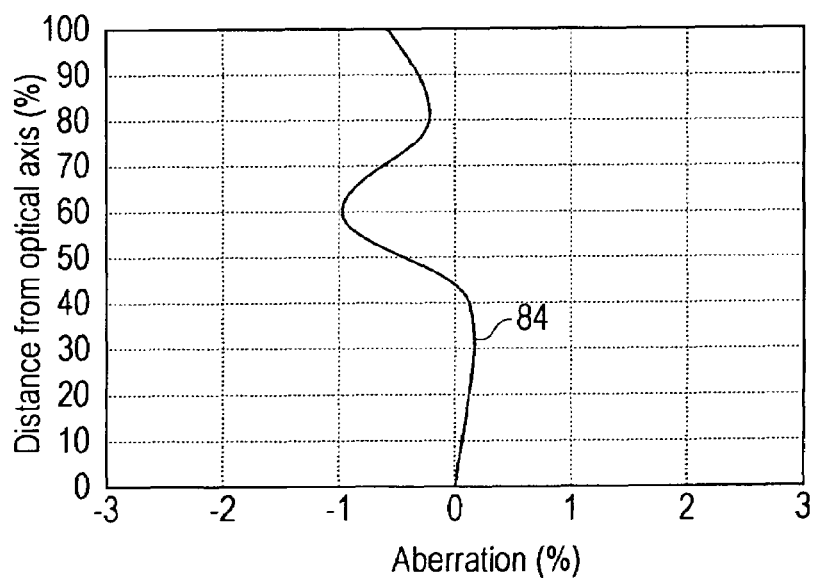
FIG. 19 is a diagram of distortion aberration of the pickup lens of the fifth Embodiment.
Figure 20:
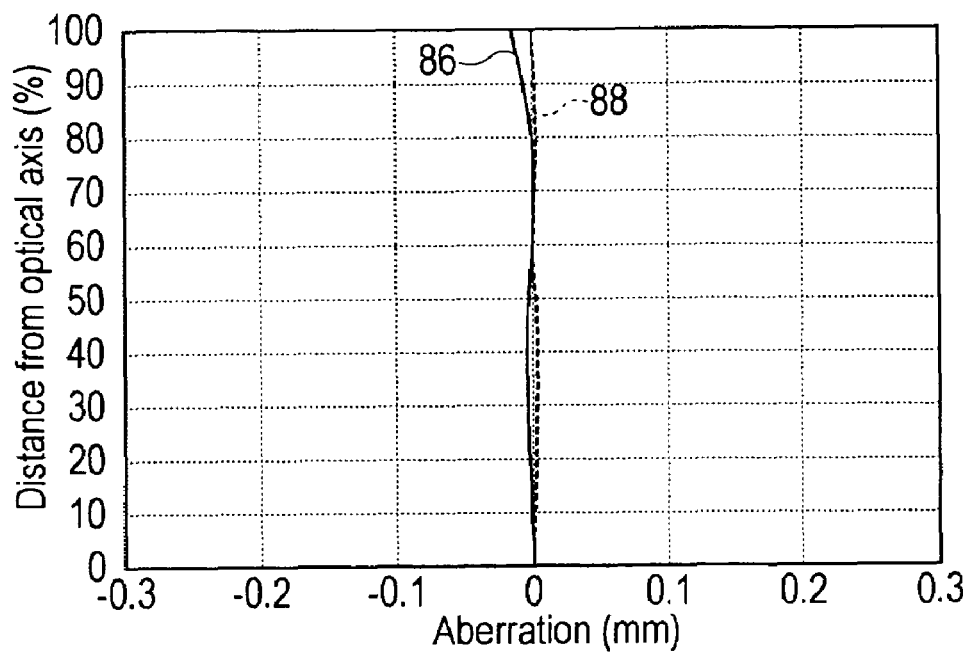
FIG. 20 is a diagram of astigmatic aberration of the pickup lens of the fifth Embodiment; and, FIG. 21 is a diagram of the chromatic/spherical aberration of the pickup lens of the fifth Embodiment.
Figure 21:
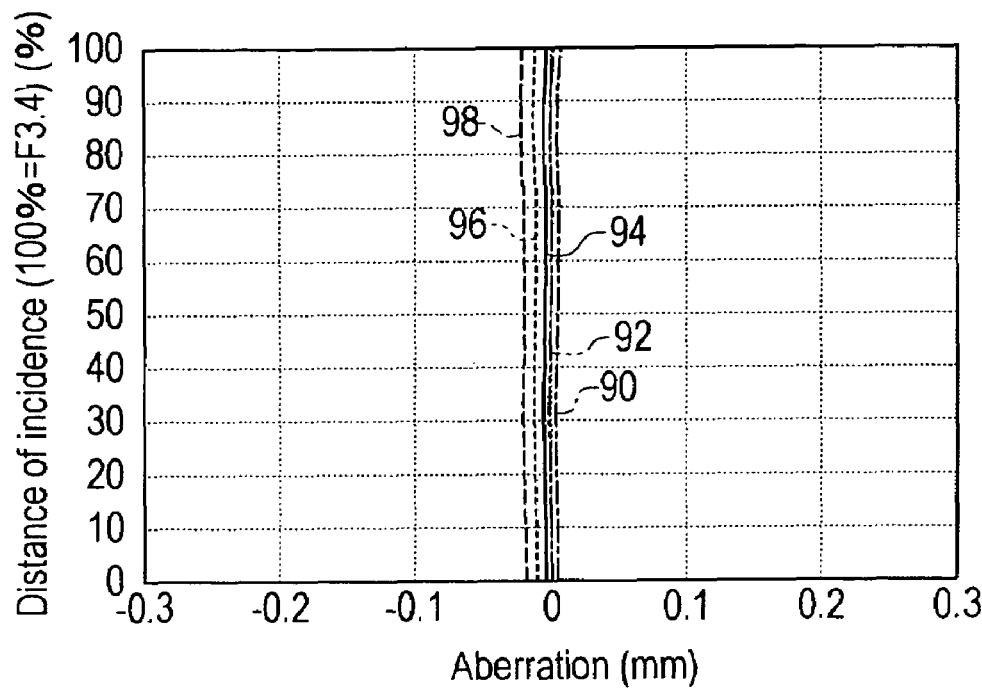

FIG. 19 shows the distortion aberration curve 84, FIG. 20 shows the astigmatic aberration curves (the aberration curve 86 in the meridional plane and the aberration curve 88 in the sagittal plane), and FIG. 21 shows the chromatic/spherical aberration curves (the aberration curve 90 for the C line, aberration curve 92 for the d line, aberration curve 94 for the e line, aberration curve 96 for the F line, and aberration curve 98 for the g line).

The vertical axes of the aberration curves in FIG. 19 and FIG. 20 indicate the distance from the optical axis of the image height, as a percentage. In FIG. 19 and FIG. 20, 100% on the vertical axes corresponds to 0.590 mm. The vertical axis for the aberration curve in FIG. 21 indicates the distance of incidence h (F number); the maximum corresponds to 3.4. The horizontal axis in FIG. 19 indicates the aberration in percent; the horizontal axes in FIG. 20 and FIG. 21 indicate the aberration magnitude.

The absolute value of distortion aberration is maximum, at 0.9796%, at an image height of 60% (image height 0.354 mm). At image heights of 0.590 mm or less, the absolute value of the aberration is within 0.9796%.

The absolute value of astigmatic aberration is maximum in the meridional plane, at 0.0149 mm, at an image height of 100% (image height 0.590 mm). At image heights of 0.590 mm or less, the absolute value of the aberration is within 0.0149 mm.

The absolute value of chromatic/spherical aberration is maximum, at 0.0227 mm, for the g line of the aberration curve 98 at a distance of incidence h of 85%, and the absolute value of the aberration is within 0.0227 mm.

As is clear from the explanation of the pickup lense of the invention, by designing pickup lenses with the respective lens configurations so as to satisfy the condition equations (1) through (4), the problems to be resolved by this invention can be resolved. That is, a pickup lens is obtained in which the various aberrations are satisfactorily corrected, a sufficient back focus is obtained, and moreover a short optical length is secured.

In the above-described embodiments, cycloolefin plastics were used in the first lens L1 and third lens L3, and polycarbonate plastics were used in the second lens L2; but plastic materials other than those described in the embodiments, as well as materials other than plastics, such as for example molded glass, can of course also be used, so long as the various conditions described in the embodiments are satisfied.

As explained above, by means of a pickup lens of this invention, various aberrations are satisfactorily corrected, satisfactory images are obtained despite the short optical length, and a sufficient back focus can be secured.

Based on the above explanation, a pickup lens of this invention can be utilized not only as a camera lens incorporated in portable telephone sets, personal computers, and digital cameras, but also as camera lenses incorporated in portable information terminals (PDAs or Personal Digital Assistants), as camera lenses incorporated in toys comprising image recognition functions, and as camera lenses incorporated in equipment for monitoring, inspection, or crime prevention.

The invention claimed is:

1. A pickup lens, mounted in an image pickup device comprising a solid-state image pickup element, a length of the diagonal line in the rectangular light-receiving area of which is 2Y, comprising an aperture diaphragm S1, a first lens L1, a second lens L2, and a third lens L3, and being configured by arranging in order, from an object side to an image side, said aperture diaphragm S1, said first lens L1, said second lens L2, and said third lens L3, and wherein said first lens L1 is a lens having positive refractive power, in a meniscus shape with a convex surface directed toward the object side;

said second lens L2 is a lens having negative refractive power, in a meniscus shape with a convex surface directed toward the image side;

said third lens L3 is a lens having negative refractive power, in a meniscus shape with a convex surface directed toward the object side;

both surfaces of said first lens L1 are aspherical, both surfaces of said second lens L2 are aspherical, and both surfaces of said third lens L3 are aspherical; and the following conditions are satisfied:

$$0.57 < f_1/f < 0.65 \tag{1}$$

$$0.01 \leq r_2/r_3 \leq 0.05 \tag{2}$$

$$0.1 \leq d_3/f < 0.15 \tag{3}$$

$$0.6 < L/2Y < 0.9 \tag{4}$$

where, f: combined focal length of said pickup lens $f_1$: focal length of said first lens L1

$r_2$: radius of curvature, at the optical axis, of the object-side surface of said first lens L1 in the vicinity of the optical axis $r_3$: radius of curvature, at the optical axis, of the image-side surface of said first lens L1 in the vicinity of the optical axis $d_3$: interval between said first lens L1 and said second lens L2 along the optical axis L: optical length, which is a distance in air along the optical axis from the object-side surface of said first lens L1 to the image plane 2Y: length of a diagonal line of the rectangular light-receiving area of the solid-state image pickup element installed in the image plane of said pickup lens.

2. The pickup lens according to claim 1, wherein the refractive index of the material of said second lens L2 is higher than the refractive indices of the materials of said first lens L1 and said third lens L3, and that the Abbe number of the material of said second lens L2 is smaller than the Abbe numbers of the materials of said first lens L1 and said third lens L3.

3. The pickup lens according to claim 1, wherein said first lens L1 and said third lens L3 are formed using a cycloolefin plastic as a material, and said second lens L2 is formed using a polycarbonate as a material.

4. The pickup lens according to claim 2, wherein said first lens L1 and said third lens L3 are formed using a cycloolefin plastic as a material, and said second lens L2 is formed using a polycarbonate as a material.

* * * * *